United States Patent
Sato et al.

(10) Patent No.: US 9,598,616 B2
(45) Date of Patent: Mar. 21, 2017

(54) PRESSURE-SENSITIVE ADHESIVE COMPOSITION AND PRESSURE-SENSITIVE ADHESIVE SHEET USING SAME

(71) Applicant: TOYO INK SC HOLDINGS CO., LTD., Chuo-ku (JP)

(72) Inventors: Yuki Sato, Tokyo (JP); Toru Oya, Tokyo (JP); Yoshitaka Tone, Tokyo (JP); Takayuki Kobayashi, Tokyo (JP)

(73) Assignee: TOYO INK SC HOLDINGS CO., LTD., Chuo-ku (JP)

( * ) Notice: Subject to any disclaimer, the term of this patent is extended or adjusted under 35 U.S.C. 154(b) by 0 days.

(21) Appl. No.: 14/786,872

(22) PCT Filed: Apr. 23, 2014

(86) PCT No.: PCT/JP2014/061452
§ 371 (c)(1),
(2) Date: Oct. 23, 2015

(87) PCT Pub. No.: WO2014/175341
PCT Pub. Date: Oct. 30, 2014

(65) Prior Publication Data
US 2016/0068719 A1  Mar. 10, 2016

(30) Foreign Application Priority Data

Apr. 25, 2013  (JP) ................. 2013-092362

(51) Int. Cl.
| | |
|---|---|
| C09J 133/02 | (2006.01) |
| C09J 133/14 | (2006.01) |
| C09J 133/08 | (2006.01) |
| C09J 7/02 | (2006.01) |
| C08F 220/18 | (2006.01) |
| C08K 5/17 | (2006.01) |
| C08K 5/20 | (2006.01) |

(52) U.S. Cl.
CPC .......... C09J 133/08 (2013.01); C08F 220/18 (2013.01); C09J 7/02 (2013.01); C09J 133/02 (2013.01); C09J 133/14 (2013.01); *C08K 5/17* (2013.01); *C08K 5/20* (2013.01)

(58) Field of Classification Search
None
See application file for complete search history.

(56) References Cited

U.S. PATENT DOCUMENTS

| 2007/0148444 A1 | 6/2007 | Kamiya et al. |
| 2010/0178501 A1 | 7/2010 | Masuko et al. |

FOREIGN PATENT DOCUMENTS

| CA | 2135450 A1 | | 5/1995 |
|---|---|---|---|
| CN | 1986716 A | | 6/2007 |
| CN | 101033378 A | | 9/2007 |
| CN | 101365765 A | | 2/2009 |
| EP | 0 652 269 A1 | | 5/1995 |
| JP | 01-178568 A | | 7/1989 |
| JP | 10-279907 A | * | 10/1998 |
| JP | 2001-106985 A | | 4/2001 |
| JP | 2005-008830 A | | 1/2005 |
| JP | 2012-153816 A | | 8/2012 |
| JP | 5151982 B2 | | 2/2013 |
| JP | 5229421 B1 | | 7/2013 |
| JP | 52290421 B | * | 8/2013 |
| WO | 2008/029766 A1 | | 3/2008 |

OTHER PUBLICATIONS

International Preliminary Report on Patentability with Written Opinion issued Nov. 5, 2015 in International Application No. PCT/JP2014/061452 (submitting English Translation only).
Combined Chinese Office Action and Search Report issued Aug. 3, 2016 in Patent Application No. 201480023384.7 (with English language translation).
International Search Report issued on Jun. 24, 2014 for PCT/JP2014/061452 filed on Apr. 23, 2014.
Extended European Search Report issued Sep. 16, 2016 in Patent Application No. 14787438.2.

* cited by examiner

*Primary Examiner* — Robert Sellers
(74) *Attorney, Agent, or Firm* — Oblon, McClelland, Maier & Neustadt, L.L.P.

(57) ABSTRACT

The invention provides a pressure-sensitive adhesive composition, which is prepared by using an alcohol solvent to obtain a high-molecular weight acrylic polymer, and exhibits excellent levels of coating liquid storage stability, stability over time in the adhesiveness, aging suitability, adhesive strength, releasability and heat-resistant holding power, as well as providing a pressure-sensitive adhesive sheet. The pressure-sensitive adhesive composition comprises a specific crosslinking agent and an acrylic polymer with a glass transition temperature of −60 to 0° C. obtained by radical polymerization in an alcohol solvent of an ethylenic unsaturated bond-containing monomer comprising specific amounts of specific monomers, wherein the acrylic polymer contains a low-molecular weight component and a high-molecular weight component with an area ratio therebetween of 65/35 to 80/20, and the monomer has a carboxyl group.

7 Claims, No Drawings

PRESSURE-SENSITIVE ADHESIVE COMPOSITION AND PRESSURE-SENSITIVE ADHESIVE SHEET USING SAME

TECHNICAL FIELD

The present invention relates to a pressure-sensitive adhesive composition containing an acrylic polymer prepared using an alcohol solvent as the polymerization solvent, and a pressure-sensitive adhesive sheet which uses the pressure-sensitive adhesive composition.

BACKGROUND ART

In recent years, more stringent regulations and greater appreciation of the importance of environmental preservation have lead to increased demands for materials that, as far as possible, contain no toluene as a solvent, nor ketone-based solvents or ester-based solvents. Against this background, alcohol solvents are attracting considerable attention, and in particular, the effective utilization of bioethanol, which has minimal environmental impact, holds considerable promise. However, when acrylic polymers are synthesized using an alcohol solvent as the polymerization solvent, because chain transfer to the alcohol solvent is significant, it is difficult to increase the molecular weight of the polymer, and achieving satisfactory adhesive performance is problematic. Moreover, in the case of monomers having ethylenic unsaturated bonds such as vinyl acetate, acrylonitrile and acrylamide, which are suspected of being carcinogenic, safety concerns such as the effects on people have resulted in increasing demands for eliminating the use of such monomers in the production of acrylic polymers. If these types of monomers are not used, then the cohesion tends to deteriorate, and the adhesive strength tends to worsen, meaning achieving satisfactory adhesive performance is difficult. Achieving excellent adhesive performance requires a combination of a high-molecular weight polymer, and superior cohesion and wettability.

Known methods of polymerizing an acrylic polymer in an alcohol solvent include the methods disclosed in Patent Documents 1 to 3, which use a (meth)acrylate alkyl ester monomer and a monomer having two or more unsaturated double bonds.

However, in the examples disclosed in Patent Document 1, a batch method is used for the polymerization method, and because the amount of alcohol solvent used relative to the (meth)acrylate alkyl ester monomer is large, chain transfer to the alcohol solvent is considerable, and achieving a high-molecular weight polymer in a stable manner is problematic. Further, because an acrylate monomer is used as the monomer having two or more unsaturated double bonds, the monomer having two or more unsaturated double bonds exists until a late stage in the reaction process, and therefore localized increases in the molecular weight are more likely, and there is a tendency for gelling to occur.

Moreover, in Patent Documents 1, 2 and 4, because an isocyanate compound is used as a crosslinking agent, when the pressure-sensitive adhesive composition is stored for a long period of time, a reaction occurs between the isocyanate group and the alcohol solvent, resulting in a deterioration in the storage stability of the coating liquid, and as the reaction between the isocyanate group and the alcohol solvent progresses, other problems also arise, including a decrease in the amount of crosslinked structures, a deterioration (change) in the adhesive performance over time, and a deterioration in the releasability. Further, the adhesive strength to adherends cannot be said to be entirely satisfactory.

Furthermore, in Patent Document 3, besides the isocyanate compound, a titanium compound may also be used as the crosslinking agent, but the resulting adhesive strength, releasability, and heat-resistant holding power and the like are unsatisfactory, and the adhesive performance is not entirely satisfactory.

Further, Patent Document 4 states that excellent adhesive properties can be achieved by using an acrylic polymer containing a high-molecular weight component and a low-molecular weight component within a single polymer, in which the amount of the low-molecular weight component is greater than that of the high-molecular weight component. However, because this polymer lacks branched structures, the adhesive strength and wettability relative to adherends having poor adhesiveness such as polyolefins are inadequate, meaning the adhesive is not entirely satisfactory.

PRIOR ART DOCUMENTS

Patent Documents

Patent Document 1: JP 2005-8830 A
Patent Document 2: JP H01-178568 A
Patent Document 3: JP 2001-106985 A
Patent Document 4: JP 2012-153816 A

SUMMARY OF THE INVENTION

Problems to be Solved by the Invention

The present invention has an object of providing a pressure-sensitive adhesive composition which is prepared by using an alcohol solvent to obtain a high-molecular weight acrylic polymer, exhibits good coating liquid storage stability, favorable stability over time in the adhesive strength and good aging suitability, does not use monomers with ethylenic unsaturated bonds that are suspected of being carcinogenic, and yet yields favorable adhesive performance, good adhesive strength, releasability, various adherends, and excellent heat-resistant holding power, as well as providing a pressure-sensitive adhesive sheet that is prepared using the composition.

Means to Solve the Problems

As a result of intensive investigation aimed at achieving the above object, the inventors of the present invention were able to complete the present invention.

In other words, the present invention relates to a pressure-sensitive adhesive composition comprising a crosslinking agent (D) and an acrylic polymer (X) with a glass transition temperature of −60 to 0° C. obtained by radical polymerization in an alcohol solvent (C) of an ethylenic unsaturated bond-containing monomer comprising 98.0 to 99.9% by weight of a monomer (A) having one ethylenic unsaturated bond per molecule and 0.1 to 2.0% by weight of a methacrylate monomer (B) having two ethylenic unsaturated bonds per molecule, wherein
  the acrylic polymer (X)
  has two peak tops in a gel permeation chromatography (GPC) elution curve,
  comprises a low-molecular weight component with a weight-average molecular weight of 10,000 to 200,000, and a high-molecular weight component with a weight-average molecular weight of 700,000 to 1,500,000, and has an area ratio between the low-molecular weight component and the high-molecular weight component in GPC within a range from 65/35 to 80/20, the monomer (A) comprises a monomer having a carboxyl group, and the crosslinking agent (D) comprises at least one compound selected from the group consisting of epoxy compounds (D1) and carbodiimide compounds (D2).

Further, the present invention also relates to the pressure-sensitive adhesive composition described above, wherein the weight-average molecular weight of the combined total of the low-molecular weight component and the high-molecular weight component is from 200,000 to 500,000, and the ratio (Mw/Mn) between the weight-average molecular weight (Mw) and the number-average molecular weight (Mn) is from 3.0 to 10.0.

Further, the present invention also relates to the pressure-sensitive adhesive composition described above, wherein the carboxyl groups in the acrylic polymer (X) are neutralized with an amine compound (E) having a boiling point of 150° C. or lower, and the amount of the amine compound (E) is from 1 to 3 mol per 1 mol of carboxyl groups within the acrylic polymer (X).

Furthermore, the present invention also relates to the pressure-sensitive adhesive composition described above, wherein the crosslinking agent (D) is an aqueous or water-dispersed carbodiimide compound (D3).

Moreover, the present invention also relates to a method for producing the pressure-sensitive adhesive composition described above, wherein the acrylic polymer (X) is produced by a radical polymerization of 100 parts by weight of the ethylenic unsaturated bond-containing monomer in 20 to 50 parts by weight of ethanol.

Further, the present invention also relates to the above method for producing the pressure-sensitive adhesive composition, wherein the acrylic polymer (X) is produced by a radical polymerization of the ethylenic unsaturated bond-containing monomer using a dropwise addition method.

Moreover, the present invention also relates to a pressure-sensitive adhesive sheet comprising a pressure-sensitive adhesive layer formed from the pressure-sensitive adhesive composition described above.

Effects of the Invention

By using the present invention, a high-molecular weight polymer can be obtained in a stable manner even when using an alcohol solvent, and particularly ethanol. Moreover, a pressure-sensitive adhesive composition can be provided which exhibits excellent coating liquid storage stability following addition of the crosslinking agent, does not use monomers with ethylenic unsaturated bonds that are suspected of being carcinogenic, and yet yields good adhesive strength to various adherends and excellent heat-resistant holding power. A pressure-sensitive adhesive sheet that is prepared using the composition can also be provided.

EMBODIMENTS FOR CARRYING OUT THE INVENTION

Embodiments of the present invention are described below in detail, but the constituent elements detailed below are merely examples (representative examples) of embodiments of the present invention, and the present invention is not limited by the content of these embodiments, with various modifications being possible within the scope of the invention.

<Acrylic Polymer (X)>

The pressure-sensitive adhesive composition used in the present invention comprises an acrylic polymer (X) having carboxyl groups that is obtained by radical polymerization in an alcohol solvent (C) of a monomer comprising a main monomer (A) having one ethylenic unsaturated bond per molecule and a methacrylate monomer (B) having two ethylenic unsaturated bonds per molecule, wherein the acrylic polymer (X) comprises a low-molecular weight component with a weight-average molecular weight of 10,000 to 200,000 and a high-molecular weight component with a weight-average molecular weight of 700,000 to 1,500,000, and has an area ratio between the low-molecular weight component and the high-molecular weight component in GPC within a range from 65/35 to 80/20.

In the present invention, the expression "carboxyl groups" includes neutralized carboxylate structures.

<Monomer (A) Having One Ethylenic Unsaturated Bond Per Molecule>

First is a description of the monomer (A) having one ethylenic unsaturated bond per molecule. Examples of the monomer having one ethylenic unsaturated bond per molecule include (meth)acrylic acid, (meth)acrylate esters or (meth)acrylate, and (meth)acrylic acid salts. The expression "(meth)acrylate ester monomer" means both acrylate ester monomer and methacrylate ester monomer. Usually, in order to achieve crosslinking of the acrylic polymer to impart the pressure-sensitive adhesive layer with favorable durability, the acrylic polymer (X) is obtained by copolymerization of an ethylenic unsaturated monomer that does not have a functional group capable of reacting with a crosslinking agent (D) described below, and an ethylenic unsaturated monomer that has a functional group capable of reacting with the crosslinking agent (D).

In the acrylic polymer (X) of the present invention, the monomer (A) having one ethylenic unsaturated bond per molecule contains a monomer having a carboxyl group as the functional group that is capable of reacting with a functional group of the crosslinking agent (D).

<<Monomer Having a Carboxyl Group>>

Examples of the monomer having one ethylenic unsaturated bond per molecule and also having a carboxyl group include (meth)acrylic acid, 2-carboxyethyl (meth)acrylate, crotonic acid, maleic acid, itaconic acid, fumaric acid, citraconic acid and mesaconic acid. Further, the above monomers having a carboxyl group may be a state of being neutralized by amine compound (E), described below.

In the present invention, copolymerization is preferably conducted with the carboxyl group-containing ethylenic unsaturated monomer representing 1 to 40% by weight of the 100% by weight of the total amount of all the ethylenic unsaturated monomers (the total amount of (A) and (B)). The amount of the carboxyl group-containing ethylenic unsaturated monomer is more preferably from 2 to 30% by weight, and most preferably from 2 to 10% by weight.

If this amount is less than 1% by weight, then because the amount of crosslinked structures is inadequate, the cohesion deteriorates, and the adhesive strength and releasability worsen. In contrast, if the amount exceeds 40% by weight, then the storage stability deteriorates, and the glass transition temperature tends to become too high, meaning appropriate adhesive performance may be unobtainable.

(Other Monomers)

The monomer (A) having one ethylenic unsaturated bond per molecule may also favorably include an alkyl (meth) acrylate ester monomer in which the alkyl group of the ester portion has a carbon number of 1 to 20 as an ethylenic unsaturated monomer not having a functional group capable of reacting with the crosslinking agent (D), namely an ethylenic unsaturated monomer not having a carboxyl group.

Specific examples of the alkyl (meth)acrylate ester monomer in which the alkyl group of the ester portion has a carbon number of 1 to 20 include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate and stearyl (meth)acrylate. These compounds may be used individually, or combinations of two or more compounds may be used.

Among these compounds, alkyl acrylate ester monomers in which the alkyl group of the ester portion has a carbon number of 1 to 10 are preferred, and butyl acrylate and 2-ethylhexyl acrylate are particularly preferred as they facilitate a reduction in the glass transition temperature of the acrylic polymer (X) described below, and enable favorable adhesive performance to be obtained.

<Methacrylate Monomer (B) Having Two Ethylenic Unsaturated Bonds Per Molecule>

Next is a description of the methacrylate monomer (B) having two ethylenic unsaturated bonds per molecule. The present invention uses this methacrylate monomer (B) having two ethylenic unsaturated bonds per molecule to obtain an acrylic polymer (X) with favorable adhesive strength, which has a high molecular weight due to suppression of any reduction in the molecular weight caused by chain transfer to the ethanol used as the polymerization solvent described below, and preferably has a branched structure.

When a radical polymerization of a mixed system containing an acrylate monomer and a methacrylate monomer is conducted, the methacrylate monomer is generally consumed first. Accordingly, it is preferable that a monomer having one ethylenic unsaturated bond per molecule is used as the monomer (A), and that the methacrylate monomer (B) having two ethylenic unsaturated bonds per molecule is consumed first, thus ensuring that the formation of branched structures is concentrated during the initial stages of the polymerization, with the formation of branched structures occurring less frequently during the latter stages of the polymerization. This not only reduces the likelihood of localized gelling and increases in viscosity, but also ensures a high-molecular weight component having large numbers of branched structures formed during the initial stages of polymerization, meaning an improvement in the cohesion of the adhesive composition. Further, a low-molecular weight component having some branched structures formed in the latter stages of the polymerization is able to impart the composition with superior adhesive strength, particularly to polyolefins and the like.

If an acrylate monomer having two ethylenic unsaturated bonds per molecule or a (meth)acrylate monomer having three or more ethylenic unsaturated bonds per molecule is used instead of the methacrylate monomer (B) having two ethylenic unsaturated bonds per molecule, then control of the molecular weight of the acrylic polymer (X) becomes difficult, and there is an increased likelihood of localized gelling and the like, which is undesirable.

Specific examples of the methacrylate monomer (B) having two ethylenic unsaturated bonds per molecule include dimethacrylates such as ethylene glycol dimethacrylate, diethylene glycol dimethacrylate, polyethylene glycol dimethacrylate, propylene glycol dimethacrylate, polypropylene glycol dimethacrylate, 1,4-butanediol dimethacrylate, neopentyl glycol dimethacrylate, 1,6-hexanediol dimethacrylate, 1,9-nonanediol dimethacrylate, 1,10-decanediol dimethacrylate and tricyclodecane dimethanol dimethacrylate. A wide range of monomers other than those listed above can also be used, provided they are methacrylate monomers having two ethylenic unsaturated bonds per molecule.

The amount of the methacrylate monomer (B) having two ethylenic unsaturated bonds per molecule within the 100% by weight of all the ethylenic unsaturated monomers (the total amount of (A) and (B)) is typically from 0.1 to 2.0% by weight, preferably from 0.2 to 1.5% by weight, and more preferably from 0.5 to 1.5% by weight.

If this amount is less than 0.1% by weight, then the molecular weight is less likely to increase, satisfactory adhesion is difficult to obtain, and the adhesive strength and releasability tend to deteriorate. In contrast, if the amount exceeds 2.0% by weight, then the molecular weight tends to increase too much, and an excess of branched structures is generated, resulting in gelling or excessively high viscosity that causes a deterioration in the coating properties, and excessively high cohesion that can sometimes cause a decrease in the adhesive strength.

<Alcohol Solvent (C)>

Next is a description of the alcohol solvent (C). In the present invention, the acrylic polymer (X) is prepared by a radical polymerization of the ethylenic unsaturated monomers in the alcohol solvent (C) using a radical polymerization initiator. The radical polymerization can be performed using a conventional polymerization method, but a dropwise addition method is preferable. Examples of the alcohol solvent (C) used in the present invention include aliphatic alcohols having a carbon number of 1 to 7 such as methanol, ethanol, normal propanol, isopropanol, normal butanol, isobutanol and tertiary butanol, as well as glycol monoethers such as propylene glycol monomethyl ether, propylene glycol monoethyl ether, propylene glycol monopropyl ether, propylene glycol monoisopropyl ether and propylene glycol monobutyl ether. Among these, in terms of minimizing the environmental impact and ensuring a fast volatilization rate, ethanol is preferable when polymerizing the acrylic polymer (X).

Further, when a solvent is used as a diluting solvent to adjust the viscosity of the composition, either following the polymerization or when coating is performed using the pressure-sensitive adhesive composition, the use of ethanol or isopropanol is preferred.

The amount of the alcohol solvent (C) used when performing the radical polymerization in the present invention is preferably within a range from 20 to 50 parts by weight, and more preferably from 30 to 40 parts by weight, per 100 parts by weight of the ethylenic unsaturated monomers. If this amount is less than 20 parts by weight, then not only does the reaction heat generated during the polymerization tend to become excessive, making control of the reaction difficult, but localized gelling tends to occur, which can cause a marked deterioration in the solubility of the acrylic polymer (X) in the alcohol solvent (C) and the coating properties of the composition. In contrast, if the amount exceeds 50 parts by weight, then chain transfer to the alcohol solvent (C) tends to increase, meaning increasing the molecular weight becomes more difficult, and because it becomes more difficult to obtain an acrylic polymer (X) containing a low-molecular weight component and a high-molecular weight component, favorable adhesive performance may sometimes be unattainable. The alcohols solvents (C) described above may be used individually, or combinations of two or more solvents may be used.

Examples of the polymerization initiator used when polymerizing the above monomers include organic peroxides such as benzoyl peroxide, tert-butyl perbenzoate, cumene hydroperoxide, diisopropyl peroxydicarbonate, di-n-propyl peroxydicarbonate, di(2-ethoxyethyl) peroxydicarbonate, tert-butyl peroxy-2-ethylhexanoate, tert-butyl peroxyneodecanoate, tert-butyl peroxypivalate, (3,5,5-trimethylhexanoyl) peroxide, dipropionyl peroxide, diacetyl peroxide and dilauroyl peroxide, and azo-based compounds such as 2,2'-azobisisobutyronitrile, 2,2'-azobis(2-methylbutyronitrile), 1,1'-azobis(cyclohexane-1-carbonitrile), 2,2'-azobis(2,4-dimethylvaleronitrile), 2,2'-azobis(2,4-dimethyl-4-methoxyvaleronitrile), dimethyl 2,2'-azobis(2-methylpropionate), 4,4'-azobis(4-cyanovaleric acid), 2,2'-azobis(2-hydroxymethylpropionitrile) and 2,2'-azobis[2-(2-imidazolin-2-yl)propane].

There are no particular limitations on the above polymerization initiators, which may be used individually, or in appropriate mixtures containing two or more polymerization initiators.

<Production of Acrylic Polymer (X)>

A description of a method for producing the acrylic polymer (X) of the present invention is presented below. The acrylic polymer (X) of the present invention is a polymer obtained by performing a radical polymerization of an ethylenic unsaturated monomer containing the specific monomers (A) and (B) described above, an alcohol solvent and a polymerization initiator, and includes a low-molecular weight component and a high-molecular weight component.

The polymerization method is preferably a dropwise addition method, which limits the heat generation from the polymerization reaction, enables the amount of alcohol solvent used during the polymerization to be minimized, enables the high-molecular weight component to be obtained with good stability due to a reduction in chain transfer, and preferably yields a polymer in which the high-molecular weight component and the low-molecular weight component both have branched structures.

Next is a description of the molecular weight of the acrylic polymer (X).

As described above, by ensuring that the methacrylate monomer having two ethylenic unsaturated bonds per molecule is consumed during the reaction prior to the monomer (A) having one ethylenic unsaturated bond per molecule, the acrylic polymer (X) of the present invention has two peak tops in the gel permeation chromatography (GPC) elution curve, representing a low-molecular weight component (MwL) with a standard polystyrene-equivalent weight-average molecular weight (Mw) of 10,000 to 200,000 and a high-molecular weight component (MwH) with a weight-average molecular weight of 700,000 to 1,500,000, and the area ratio between the peaks, represented by [low-molecular weight component/high-molecular weight component] is within a range from 65/35 to 80/20, with the low-molecular weight component (MwL) being the main component.

If the proportion of the low-molecular weight component (MwL) is less than 65, then the wettability deteriorates, and good adhesive strength, particularly to polyolefin adherends such as polypropylene (PP), may be unattainable, whereas if the proportion exceeds 80, then imparting the polymer with good cohesion becomes difficult, and the releasability may sometimes deteriorate.

Further, the weight-average molecular weight (Mw) of the entire acrylic polymer (X) of the present invention is preferably from 200,000 to 500,000, and more preferably from 200,000 to 400,000. If the weight-average molecular weight (Mw) is less than 200,000, then imparting satisfactory cohesion for use as a pressure-sensitive adhesive may sometimes become difficult. On the other hand, if the weight-average molecular weight exceeds 500,000, then the proportion of the high-molecular weight component (MwH) increases, and because this leads to an increase in the viscosity and potential localized gelling, the coatability during preparation of a pressure-sensitive adhesive sheet and the solubility in the alcohol solvent tend to deteriorate, and although the cohesion improves, the wettability of adherends deteriorates, meaning favorable adhesive strength may sometimes be unobtainable.

For the acrylic polymer (X) of the present invention, the ratio (Mw/Mn) between the weight-average molecular weight (Mw) and the number-average molecular weight (Mn) is within a range from 3.0 to 10.0, and preferably from 6.0 to 7.0.

When the acrylic polymer (X) of the present invention is used as a pressure-sensitive adhesive, in order to achieve a good balance of adhesive properties (and in particular, a favorable combination of wettability and cohesion), the glass transition temperature is preferably from −60 to 0° C., and more preferably from −50 to −10° C. If the glass transition temperature is lower than −60° C., then the cohesion deteriorates and the durability also deteriorates. On the other hand, if the glass transition temperature exceeds 0° C., then the wettability deteriorates significantly and favorable adhesive strength may be unattainable, which is also undesirable.

<Acrylic Polymer (X2)>

The present invention can also use an acrylic polymer (X2), obtained by neutralizing the carboxyl groups within the acrylic polymer (X) using an amine compound (E) as the neutralizing agent.

If toluene, a ketone-based solvent, or an ester-based solvent or the like is used as the radical polymerization solvent, then neutralization of the carboxyl groups with a neutralizing agent can cause various problems, including precipitation of the salt formed by the neutralization, a significant increase in the viscosity, gelling, and inadequate formation of the salt structures, but when an alcohol solvent is used as the solvent, these types of problems generated as a result of the neutralization do not arise, and the formed salt exists in a stable state.

As a result, by using the acrylic polymer (X2), reaction control can be achieved upon addition of the crosslinking agent (D) described below, and a combination of superior storage stability and aging characteristics can be achieved, which is particularly desirable.

(Amine Compound (E))

In the present invention, a crosslinking reaction is initiated by the crosslinking agent (D), and therefore the neutralizing agent must be able to be eliminated and volatilized during drying. If elimination and volatilization of the amine compound (E) is inadequate, and the amine compound is retained in the pressure-sensitive adhesive sheet, then the crosslinking reaction may not proceed satisfactorily, the aging time may lengthen and the releasability may worsen, and therefore in order to ensure that the amine compound volatilizes during drying, enabling the reaction between the carboxyl groups and the crosslinking agent (D) to proceed rapidly, a tertiary amine compound having a boiling point of 150° C. or lower is preferred.

Specifically, ammonia, or trimethylamine, triethylamine, 2-dimethylaminoethanol, or 1-dimethylamino-2-propanol or the like is preferable.

The amine compound (E) used in the present invention is preferably used in an amount that provides 1.0 to 3.0 mol of the amine compound (E) per 1 mol of carboxyl groups within the acrylic polymer (X). If this amount is less than 1.0 mol, then carboxyl groups that have not been neutralized will exist, and therefore if a crosslinking agent (D) that exhibits high reactivity with carboxyl groups is used, there is a possibility that the storage stability may deteriorate. Alternatively, if the amount exceeds 3.0 mol, then the excess amine compound (E) and the crosslinking agent (D) may react, causing a deterioration in the coating liquid stability and the degree of crosslinking.

<Crosslinking Agent (D)>

Next is a description of the crosslinking agent (D). The crosslinking agent (D) has a reactive functional group capable of reacting with the reactive functional groups within the acrylic polymer (X), and by reacting with the acrylic polymer (X), forms a network-like crosslinked structure, thus producing an appropriate elastic modulus for use as a pressure-sensitive adhesive, and imparting favorable substrate adhesiveness. The reactive functional group contained within the crosslinking agent (D) may be any functional group capable of reacting with the reactive functional groups of the acrylic polymer (X), but functional groups such as isocyanate groups which react with alcohol solvents at room temperature tend to be deactivated before reaction between the crosslinking agent (D) and the acrylic polymer (X) can occur, meaning a satisfactory crosslinked structure cannot be formed, and are consequently undesirable.

The present invention requires a crosslinking agent (D) having a functional group that reacts with the functional groups contained in the acrylic polymer (X) within the pressure-sensitive adhesive composition, namely the carboxyl groups, but does not react with the alcohol solvent. The crosslinking agent (D) typically includes at least one compound selected from the group consisting of epoxy compounds (D1) and carbodiimide compounds (D2).

(Epoxy Compounds (D1))

Examples of the epoxy compounds (D1) include ethylene glycol diglycidyl ether, polyethylene glycol diglycidyl ether, 1,6-hexanediol diglycidyl ether, bisphenol A-epichlorohydrin epoxy resins, N,N,N',N'-tetraglycidyl-m-xylylenediamine, 1,3-bis(N,N-diglycidylaminomethyl)cyclohexane, N,N-diglycidylaniline and N,N-diglycidyltoluidine.

(Carbodiimide Compounds (D2))

Compounds having two or more carbodiimide groups (—N=C=N—) in the molecule can be used favorably as the carbodiimide compound (D2), and conventional polycarbodiimides can be used. Further, a high-molecular weight polycarbodiimide produced by a decarboxylation condensation reaction of a diisocyanate can also be used as the carbodiimide compound (D2). Examples of the diisocyanate compounds include one compound or a mixture of compounds selected from among 4,4'-diphenylmethane diisocyanate, 3,3'-dimethoxy-4,4'-diphenylmethane diisocyanate, 3,3'-dimethyl-4,4'-diphenylmethane diisocyanate, 4,4'-diphenyl ether diisocyanate, 3,3'-dimethyl-4,4'-diphenyl ether diisocyanate, 2,4-tolylene diisocyanate, 2,6-tolylene diisocyanate, 1-methoxyphenyl-2,4-diisocyanate, isophorone diisocyanate, 4,4'-dicylcohexylmethane diisocyanate and m-tetramethylxylylene diisocyanate.

Further, among high-molecular weight polycarbodiimide compounds, aqueous or water-dispersed carbodiimide compound (D3) having a hydrophilic component such as an alkylene oxide added at the terminals, which exhibit good compatibility with alcohol solvents and excellent stability, are preferred.

Specific examples include terminal polyethylene oxide monomethyl ether adducts of m-tetramethylxylylenecarbodiimide, terminal polyethylene oxide monomethyl ether/polypropylene oxide monomethyl ether adducts of m-tetramethylxylylenecarbodiimide, terminal polyethylene oxide monomethyl ether adducts of 4,4'-dicyclohexylmethanecarbodiimide, and terminal polyethylene oxide monomethyl ether/polypropylene oxide monomethyl ether adducts of 4,4'-dicyclohexylmethanecarbodiimide.

Examples of these types of high-molecular weight polycarbodiimides include the products Carbodilite SV-02, V-02, 02-2L, 04, E-01 and E-02, manufactured by Nisshinbo Holdings Inc.

When an acrylic polymer (X2) obtained by neutralizing the acrylic polymer (X) having carboxyl groups with the amine compound (E) is used, the use of a highly reactive carbodiimide compound (D2) is preferred, as it enables particularly superior aging characteristics to be achieved while maintaining good coating liquid stability.

These crosslinking agents may be used individually, or a combination of two or more crosslinking agents may be used.

The amount used of the crosslinking agent (D) is preferably set so that the ratio of the number of moles of functional groups incorporated in the crosslinking agent (D) relative to the number of moles of carboxyl groups within the acrylic polymer (X) is within a range from 0.05 to 0.6. If this ratio is less than 0.05, then the degree of crosslinking is too low, satisfactory cohesion may be unobtainable, and the adhesive strength and heat resistance may deteriorate, whereas if the ratio exceeds 0.6, then the degree of crosslinking becomes too high, the cohesion becomes excessive, and the adhesiveness to adherends may deteriorate.

<Additives>

The types of additives typically used in pressure-sensitive adhesives may be added to the pressure-sensitive adhesive composition of the present invention according to need, including tackifiers, plasticizers, antioxidants, ultraviolet absorbers, various stabilizers, leveling agents, various chemical agents, fillers, pigments and dyes. These additives may be used individually, or combinations of two or more additives may be used, and there are no particular limitations on the amounts used of these additives.

By using the pressure-sensitive adhesive composition of the present invention, a laminated product (hereafter referred to as a "pressure-sensitive adhesive sheet") formed from a pressure-sensitive adhesive layer and a sheet-like substrate can be obtained.

A general description of the pressure-sensitive adhesive composition and the pressure-sensitive adhesive sheet is provided here. The basic layer configuration of the pressure-sensitive adhesive sheet may be either a single-sided pressure-sensitive adhesive sheet with a configuration such as film-like substrate/pressure-sensitive adhesive layer/releasable film, or a double-sided pressure-sensitive adhesive sheet with a configuration such as releasable film/pressure-sensitive adhesive layer/film-like substrate/pressure-sensitive adhesive layer/releasable film. When used, the releasable film is removed, and the pressure-sensitive adhesive layer is bonded to an adherend. The pressure-sensitive adhesive composition requires not only tack for the pressure-sensitive adhesive layer in the instant that the pressure-sensitive adhesive layer makes contact with the adherend, but unlike other adhesives besides pressure-sensitive adhesive compositions (hereafter simply referred to as "adhesives"), also requires that the composition does not completely harden during adhesion, but rather retains tack and an appropriate level of hardness, and has sufficient cohesion to retain a state of tackiness. This cohesion is dependent upon the molecular weight of the acrylic polymer and the monomers used.

Examples of the releasable film include cellophane, various plastic films, and films prepared by subjecting the surface of a film-like substrate such as a paper to a release treatment with a silicone compound or a fluorine compound. The film-like substrate may be either a substrate of a single layer, or a multilayer substrate prepared by laminating a plurality of substrates.

Examples of the various plastic films or sheets that can be used as the film-like substrate or the releasable film include polyhydroxyethene films, triacetyl cellulose films, polyolefin-based resin films such as polypropylene, polyethylene, polycycloolefins and ethylene-vinyl acetate copolymers, polyester-based resin films such as polyethylene terephthalate and polybutene terephthalate, polycarbonate-based resin films, polynorbornene-based resin films, polyarylate-based resin films, propenoic acid-based resin films, polyphenylene sulfide resin films, polyethenylbenzene resin films, vinyl-based resin films, polyamide-based resin films, polyimide-based resin films and oxirane-based resin films.

The pressure-sensitive adhesive composition is coated onto the releasable film using an appropriate conventional method, and in those cases where the pressure-sensitive adhesive composition contains a liquid medium such as an organic solvent or water, the liquid medium is then removed by heating or the like, whereas in those cases where the pressure-sensitive adhesive composition contains no liquid medium that requires volatilization, the molten state resin layer is cooled and solidified, thus forming a pressure-sensitive adhesive layer on the releasable film.

The thickness of the pressure-sensitive adhesive layer, as a dried film, is preferably within a range from 1 μm to 100 μm, and is more preferably from 1 μm to 50 μm. If the thickness is less than 1 μm, then satisfactory adhesive strength may be unobtainable, whereas even if the thickness exceeds 100 μm, there is usually no further improvement in properties such as the adhesive strength.

There are no particular limitations on the method used for coating the pressure-sensitive adhesive composition of the present invention onto the releasable film, and examples include various coating methods using a Meyer bar, applicator, brush, spraying, roller, gravure coater, die coater, lip coater, comma coater, knife coater, reverse coater, or spin coater or the like.

There are no particular limitations on the drying method, and hot-air drying, or drying using infrared radiation or reduced pressure can be used. The drying conditions vary depending on the state of cross-linking within the pressure-sensitive adhesive composition, the film thickness and the solvent that was selected, but hot-air drying at a temperature of about 60 to 180° C. is usually sufficient.

In the present invention, the solid fraction of the pressure-sensitive adhesive composition is preferably from 45 to 60% by weight. Further, by ensuring that the aforementioned low-molecular weight compound (MwL) is the main component, the viscosity of the acrylic polymer (X) can be lowered, and the solid fraction of the pressure-sensitive adhesive composition during the coating process can be increased.

The pressure-sensitive adhesive sheet obtained using the method described above exhibits favorable adhesive strength to all manner of adherends, and can therefore be used for applications including label stickers, double-sided tape and masking tape.

EXAMPLES

Specific examples and comparative examples of the present invention are described below, but the present invention is in no way limited by these examples. In the following examples and comparative examples, the units "parts" and "%" indicate "parts by weight" and "% by weight" respectively.

<Measurement of Molecular Weights (Mn, Mw, MwL, MwH)>

Molecular weight measurements were performed using a GPC (gel permeation chromatography) device "HPC-8020" manufactured by Tosoh Corporation. GPC is a liquid chromatography technique in which a substance dissolved in a solvent (THF, tetrahydrofuran) is separated and quantified based on differences in the molecular sizes of the components. Determinations of the number-average molecular weight (Mn) and the weight-average molecular weight (Mw) were made relative to standard polystyrenes.

Further, measurement of the weight-average molecular weight of the low-molecular weight component (MwL) and the weight-average molecular weight of the high-molecular weight component (MwH) were made by assigning the peak fraction between 10,000 and 200,000 to the low-molecular weight component (L) and assigning the peak fraction between 700,000 to 1,500,000 to the high-molecular weight component (H), and then measuring the areas of the two peaks.

For the column, a Super HM-M column and a Super HM-L column, both manufactured by Tosoh Corporation, were linked together.

<Measurement of Glass Transition Temperature>

An "SSC5200 disk station" (manufactured by Seiko Instruments Inc.) was connected to a Robot DSC ("RDC220", a differential scanning calorimeter, manufactured by Seiko Instruments Inc.) and used for measuring the glass transition temperature. A solution of the acrylic polymer obtained in each synthesis example was coated onto a polyester releasable film and then dried. Approximately 10 mg of the dried resin was scraped off, placed in an aluminum pan as a sample, weighed, and then placed in the differential scanning calorimeter. Using the same type of aluminum pan containing no sample as a reference, the temperature was raised to 100° C. at a rate of 10° C./minute in the open air, and following heating for 5 minutes at a temperature of 100° C., the temperature was cooled rapidly to −120° C. using liquid nitrogen. Subsequently, the temperature was raised at a rate of 10° C./minute, and the glass transition temperature (units: ° C.) was determined from the DSC chart obtained during the temperature raising process.

<Synthesis of Acrylic Polymers>

Synthesis Example 1

The reaction tank and the dropwise addition tank of a polymerization reaction apparatus fitted with the reaction tank, a stirrer, a thermometer, a reflux condenser, the dropwise addition tank and a nitrogen inlet tube were charged with the monomer (A) having one ethylenic unsaturated bond per molecule, the methacrylate monomer (B) having two ethylenic unsaturated bonds per molecule, an alcohol (C), and a polymerization initiator, using the respective amounts shown in Table 1, the air inside the reaction tank was replaced with nitrogen gas, a reaction was then started by raising the temperature to 80° C., and the mixture inside the dropwise addition tank was then added dropwise to the reaction tank over a period of one hour.

Two hours after starting the reaction, an additional 0.02 parts of the polymerization initiator PEROYL L was added, four hours after starting the reaction, another 0.06 parts was added, and the reaction was then continued for a further 3 hours. Following completion of the reaction, 23.8 parts of the alcohol (C) was added as a diluting solvent, and the solution was then cooled to room temperature to obtain an acrylic polymer (X-1).

The thus obtained acrylic polymer has a weight-average molecular weight for the low-molecular weight component (MwL) of 150,000, a weight-average molecular weight for the high-molecular weight component (MwH) of 900,000, an area ratio between the two components, namely (low-molecular weight component)/(high-molecular weight component), of 75/25, an overall weight-average molecular weight (Mw) of 300,000, a ratio Mw/Mn between the weight-average molecular weight (Mw) and the number-average molecular weight (Mn) of 6.5, a glass transition temperature of −35° C., and a non-volatile fraction of 60%.

Synthesis Example 3 to Synthesis Example 15

Using the formulations shown in Table 1 and the same synthesis method as Synthesis Example 1, acrylic polymers (X-2) to (X-14) were synthesized.

Synthesis Example 16 to Synthesis Example 25

Acrylic polymers were synthesized using the formulations shown in Table 2 and the same synthesis method as Synthesis Example 1, and following reaction, an amount of the alcohol (C) shown in Table 2 was added as a diluting solvent, and the resulting solution was cooled to room temperature. An amount of an amine compound (E) shown in Table 2 was then added to achieve neutralization of the carboxyl groups, thus obtaining acrylic polymers (X2-1) to (X2-10).

Synthesis Example 26 to Synthesis Example 38

Using the formulations shown in Table 3 and the same synthesis method as Synthesis Example 1, acrylic polymers (Y-1) to (Y-13) were synthesized.

Synthesis Example 39

The reaction tank of a polymerization reaction apparatus fitted with the reaction tank, a stirrer, a thermometer, a reflux condenser and a nitrogen inlet tube was charged with the monomer (A) having one ethylenic unsaturated bond per molecule shown below, the other monomers shown in Table 4, the alcohol (C), and a polymerization initiator, using the respective amounts shown in Table 4, the air inside the reaction tank was then replaced with nitrogen gas, the temperature was raised to 80° C. while the tank contents were stirred, and after performing a reaction for 7 hours, the temperature was cooled to room temperature to obtain an acrylic polymer (Y-14).

The thus obtained acrylic polymer had only a single peak top, and had a weight-average molecular weight (Mw) of 150,000, a glass transition temperature of −45° C., and a non-volatile fraction of 50%.

Synthesis Example 40

The reaction tank of a polymerization reaction apparatus fitted with the reaction tank, a stirrer, a thermometer, a reflux condenser and a nitrogen inlet tube was charged with a monomer having one ethylenic unsaturated bond per molecule shown below, an ethyl acetate solvent, and a polymerization initiator, using the respective amounts shown in Table 4, the air inside the reaction tank was then replaced with nitrogen gas, and the temperature was raised to 90° C. while the tank contents were stirred to start a reaction. Five minutes after the polymerization conversion rate had reached 5% (25 minutes after the start of the reaction), n-dodecyl mercaptan as a chain transfer agent and 2-hydroxyethyl acrylate as a monomer were added over a period of 5 minutes, and the reaction was continued. Additional polymerization initiator was added 50 minutes after the start of the reaction, and then at 30-minute intervals thereafter, and the reaction was continued for a further 5 hours. Subsequently, 26.5 parts of ethyl acetate was added as a diluting solvent, and the resulting solution was cooled to room temperature to obtain an acrylic polymer (Y-15).

In the thus obtained acrylic polymer, the weight-average molecular weight of the low-molecular weight component (MwL) was 10,000 and the corresponding area proportion was 80%, whereas the weight-average molecular weight of the high-molecular weight component (MwH) was 800,000 and the corresponding area proportion was 20%. The overall weight-average molecular weight (Mw) was 400,000, the glass transition temperature was −36° C., and the non-volatile fraction was 60%.

Synthesis Example 41

An acrylic polymer (Y-16) was obtained using the formulation shown in Table 4 and the same synthesis method as Synthesis Example 40.

In the thus obtained acrylic polymer, the weight-average molecular weight of the low-molecular weight component (MwL) was 10,000 and the corresponding area proportion was 80%, whereas the weight-average molecular weight of the high-molecular weight component (MwH) was 800,000 and the corresponding area proportion was 20%. The overall weight-average molecular weight (Mw) was 400,000, the glass transition temperature was −38° C., and the non-volatile fraction was 60%.

Synthesis Example 42

Four parts of a 25% aqueous solution of ammonia was added at room temperature to the acrylic polymer synthesized in Synthesis Example 41, thus providing 2 mol of ammonia per 1 mol of carboxyl groups within the acrylic polymer, thereby neutralizing the carboxyl groups in the polymer to obtain an acrylic polymer (Y-17).

In the thus obtained acrylic polymer, the weight-average molecular weight of the low-molecular weight component (MwL) was 10,000 and the corresponding area proportion was 80%, whereas the weight-average molecular weight of the high-molecular weight component (MwH) was 800,000 and the corresponding area proportion was 20%. The overall weight-average molecular weight (Mw) was 400,000, the glass transition temperature was −38° C., and the non-volatile fraction was 60%.

TABLE 1

| | | | | Synthesis Example 1 | Synthesis Example 3 | Synthesis Example 4 | Synthesis Example 5 | Synthesis Example 6 | Synthesis Example 7 | Synthesis Example 8 |
|---|---|---|---|---|---|---|---|---|---|---|
| | | Acrylic polymer | | X-1 | X-2 | X-3 | X-4 | X-5 | X-6 | X-7 |
| Reaction tank | Monomer (A) | Monomer having no carboxyl group | 2-EHA | 9 | 9 | 9 | 9 | 9 | 9 | 9 |
| | | | BA | 10.2 | 10 | 10 | 10.2 | 10.2 | 10.2 | 10.5 |
| | | | EA | | | | | | | |
| | | | MA | 1.8 | 1.5 | 1.5 | 1.8 | 1.8 | 1.8 | 1.8 |
| | | Monomer having carboxyl group | AA | 0.8 | 0.8 | 0.8 | 0.8 | 0.8 | 0.8 | 0.6 |
| | | | MAA | | | | | | | |
| | Alcohol solvent (C) | | EtOH | 26.8 | 27 | 28.5 | 26.8 | 26.8 | 26.8 | 26.8 |
| | Polymerization initiator | | VA-061 | 0.005 | 0.005 | 0.005 | 0.005 | 0.005 | 0.005 | 0.005 |
| Dropwise addition tank | Monomer (A) | Monomer having no carboxyl group | 2-EHA | 32 | 32 | 32 | 32 | 32 | 32 | 32.5 |
| | | | BA | 36.15 | 36.5 | 36.1 | 36.12 | 36.1 | 36.2 | 36.45 |
| | | | EA | | | | | | | |
| | | | MA | 6.4 | 6.3 | 6.3 | 6.4 | 6.4 | 6.3 | 6.4 |
| | | Monomer having carboxyl group | AA | 2.9 | 2.9 | 2.9 | 2.9 | 2.9 | 2.9 | 2 |
| | | | MAA | | | | | | | |
| | Monomer (B) | | EDMA | 0.75 | 1 | 1.4 | | | | 0.75 |
| | | | DEDMA | | | | 0.78 | | | |
| | | | PEGDMA4 | | | | | 0.8 | | |
| | | | BDDMA | | | | | | 0.8 | |
| | Alcohol solvent (C) | | EtOH | 16 | 18 | 19.5 | 16 | 16 | 16 | 16 |
| | Polymerization initiator | | VA-061 | 0.017 | 0.017 | 0.017 | 0.017 | 0.017 | 0.017 | 0.017 |
| Polymerization initiator (after 2 hours) | | | PEROYL L | 0.02 | 0.02 | 0.02 | 0.02 | 0.02 | 0.02 | 0.02 |
| Polymerization initiator (after 4 hours) | | | PEROYL L | 0.06 | 0.06 | 0.06 | 0.06 | 0.06 | 0.06 | 0.06 |
| Alcohol solvent during polymerization (%) | | | | 42.8 | 45.0 | 48.0 | 42.8 | 42.8 | 42.8 | 42.8 |
| Amine compound (E) | | | Ammonia | | | | | | | |
| | | | DMAE | | | | | | | |
| Amine/carboxyl groups (mol) | | | | | | | | | | |
| Diluting alcohol solvent (C) | | | EtOH | 23.8 | 21.8 | 18.8 | 23.8 | 23.8 | 23.8 | 23.8 |
| Monomer (A) % by weight | | | | 99.25% | 99.00% | 98.60% | 99.22% | 99.20% | 99.20% | 99.25% |
| Monomer (B) % by weight | | | | 0.75% | 1.00% | 1.40% | 0.78% | 0.80% | 0.80% | 0.75% |
| Properties | MwL (×10,000) | | | 15 | 16 | 18 | 15 | 15 | 15 | 15 |
| | MwH (×10,000) | | | 90 | 95 | 100 | 90 | 90 | 90 | 90 |
| | Low-molecular weight component/high molecular weight component area ratio | | | 75/25 | 70/30 | 65/35 | 75/25 | 75/25 | 75/25 | 75/25 |
| | Mw (×10,000) | | | 30 | 35 | 40 | 30 | 30 | 30 | 30 |
| | Mw/Mn | | | 6.5 | 6.7 | 6.9 | 6.5 | 6.6 | 6.6 | 6.5 |
| | Glass transition temperature (° C.) | | | −35 | −35 | −35 | −35 | −35 | −35 | −37 |
| | Non-volatile fraction (%) | | | 60 | 60 | 60 | 60 | 60 | 60 | 60 |

| | | | | Synthesis Example 9 | Synthesis Example 10 | Synthesis Example 11 | Synthesis Example 12 | Synthesis Example 13 | Synthesis Example 14 | Synthesis Example 15 |
|---|---|---|---|---|---|---|---|---|---|---|
| | | Acrylic polymer | | X-8 | X-9 | X-10 | X-11 | X-12 | X-13 | X-14 |
| Reaction tank | Monomer (A) | Monomer having no carboxyl group | 2-EHA | 9 | 9 | 7.5 | 8.5 | 9 | 9 | 9 |
| | | | BA | 10.2 | 12 | 10.5 | 9.6 | 10.2 | 10.2 | 10.2 |
| | | | EA | | | 3 | | | | |
| | | | MA | 1.8 | | | 3.4 | 1.8 | 1.8 | 1.8 |
| | | Monomer having carboxyl group | AA | | 0.8 | 0.8 | 0.8 | 0.8 | 0.8 | 0.8 |
| | | | MAA | 0.8 | | | | | | |
| | Alcohol solvent (C) | | EtOH | 26.8 | 26.8 | 26.8 | 26.8 | 20 | 9 | 30 |
| | Polymerization initiator | | VA-061 | 0.005 | 0.005 | 0.005 | 0.005 | 0.005 | 0.005 | 0.005 |
| Dropwise addition tank | Monomer (A) | Monomer having no carboxyl group | 2-EHA | 32 | 33.8 | 27.5 | 28 | 32 | 32 | 32 |
| | | | BA | 36.15 | 40.95 | 36.45 | 33.95 | 36.15 | 36.15 | 36.15 |
| | | | EA | | | 10.6 | | | | |
| | | | MA | 6.4 | | | 12 | 6.4 | 6.4 | 6.4 |
| | | Monomer having carboxyl group | AA | | 2.7 | 2.9 | 3 | 2.9 | 2.9 | 2.9 |
| | | | MAA | 2.9 | | | | | | |
| | Monomer (B) | | EDMA | 0.75 | 0.75 | 0.75 | 0.75 | 0.75 | 0.75 | 0.75 |
| | | | DEDMA | | | | | | | |
| | | | PEGDMA4 | | | | | | | |
| | | | BDDMA | | | | | | | |
| | Alcohol solvent (C) | | EtOH | 16 | 16 | 16 | 16 | 23 | 16 | 20 |
| | Polymerization initiator | | VA-061 | 0.017 | 0.016 | 0.016 | 0.018 | 0.017 | 0.017 | 0.017 |
| Polymerization initiator (after 2 hours) | | | PEROYL L | 0.02 | 0.02 | 0.02 | 0.02 | 0.02 | 0.02 | 0.02 |
| Polymerization initiator (after 4 hours) | | | PEROYL L | 0.06 | 0.06 | 0.06 | 0.06 | 0.06 | 0.06 | 0.06 |
| Alcohol solvent during polymerization (%) | | | | 42.8 | 42.8 | 42.8 | 42.8 | 43.0 | 25.0 | 50.0 |
| Amine compound (E) | | | Ammonia | | | | | | | |
| | | | DMAE | | | | | | | |
| Amine/carboxyl groups (mol) | | | | | | | | | | |
| Diluting alcohol solvent (C) | | | EtOH | 23.8 | 23.8 | 23.8 | 23.8 | 23.8 | 41.6 | 16.6 |
| Monomer (A) % by weight | | | | 99.25% | 99.25% | 99.25% | 99.25% | 99.25% | 99.25% | 99.25% |
| Monomer (B) % by weight | | | | 0.75% | 0.75% | 0.75% | 0.75% | 0.75% | 0.75% | 0.75% |

TABLE 1-continued

| Properties | | | | | | | |
|---|---|---|---|---|---|---|---|
| MwL (×10,000) | 15 | 15 | 15 | 15 | 17 | 12 | 12 |
| MwH (×10,000) | 90 | 90 | 90 | 90 | 95 | 85 | 80 |
| Low-molecular weight component/high molecular weight component area ratio | 75/25 | 75/25 | 75/25 | 75/25 | 70/30 | 77/23 | 75/25 |
| Mw (×10,000) | 30 | 30 | 30 | 30 | 35 | 40 | 23 |
| Mw/Mn | 6.5 | 6.5 | 6.5 | 6.5 | 6.5 | 6.5 | 6.5 |
| Glass transition temperature (° C.) | −27 | −40 | −37 | −28 | −35 | −35 | −35 |
| Non-volatile fraction (%) | 60 | 60 | 60 | 60 | 60 | 60 | 60 |

TABLE 2

| | | | | | Synthesis Example 16 | Synthesis Example 17 | Synthesis Example 18 | Synthesis Example 19 | Synthesis Example 20 |
|---|---|---|---|---|---|---|---|---|---|
| | | Acrylic polymer | | | X2-1 | X2-2 | X2-3 | X2-4 | X2-5 |
| Reaction tank | Monomer (A) | Monomer having no carboxyl group | 2-EHA | | 9 | 9 | 9 | 9 | 9 |
| | | | BA | | 10.2 | 10.2 | 10.2 | 10.2 | 10.2 |
| | | | EA | | | | | | |
| | | | MA | | 1.8 | 1.8 | 1.8 | 1.8 | 1.8 |
| | | Monomer having carboxyl group | AA | | 0.8 | 0.8 | 0.8 | 0.8 | 0.8 |
| | | | MAA | | | | | | |
| | | Alcohol solvent (C) | EtOH | | 26.8 | 26.8 | 26.8 | 26.8 | 26.8 |
| | | Polymerization initiator | VA-061 | | 0.005 | 0.005 | 0.005 | 0.005 | 0.005 |
| Dropwise addition tank | Monomer (A) | Monomer having no carboxyl group | 2-EHA | | 32 | 32 | 32 | 32 | 32 |
| | | | BA | | 36.15 | 36.15 | 36.15 | 36.15 | 36.15 |
| | | | EA | | | | | | |
| | | | MA | | 6.4 | 6.4 | 6.4 | 6.4 | 6.4 |
| | | Monomer having carboxyl group | AA | | 2.9 | 2.9 | 2.9 | 2.9 | 2.9 |
| | | | MAA | | | | | | |
| | | Monomer (B) | EDMA | | 0.75 | 0.75 | 0.75 | 0.75 | 0.75 |
| | | | DEDMA | | | | | | |
| | | | PEGDMA4 | | | | | | |
| | | Alcohol solvent (C) | EtOH | | 16 | 16 | 16 | 16 | 16 |
| | | Polymerization initiator | VA-061 | | 0.017 | 0.017 | 0.017 | 0.017 | 0.017 |
| Polymerization initiator (after 2 hours) | | | PEROYL L | | 0.02 | 0.02 | 0.02 | 0.02 | 0.02 |
| Polymerization initiator (after 4 hours) | | | PEROYL L | | 0.06 | 0.06 | 0.06 | 0.06 | 0.06 |
| Alcohol solvent during polymerization (%) | | | | | 42.8 | 42.8 | 42.8 | 42.8 | 42.8 |
| Amine compound (E) | | | Ammonia | | 2 | 4 | 6 | | |
| | | | DMAE | | | | | 2.5 | 5 |
| Amine/carboxyl groups (mol) | | | | | 1 | 2 | 3 | 1 | 2 |
| Diluting alcohol solvent (C) | | | EtOH | | 22 | 20 | 18 | 21.5 | 19 |
| Monomer (A) % by weight | | | | | 99.25% | 99.25% | 99.25% | 99.25% | 99.25% |
| Monomer (B) % by weight | | | | | 0.75% | 0.75% | 0.75% | 0.75% | 0.75% |
| Properties | MwL (×10,000) | | | | 12 | 12 | 12 | 12 | 12 |
| | MwH (×10,000) | | | | 90 | 90 | 90 | 90 | 90 |
| | Low-molecular weight component/high molecular weight component area ratio | | | | 75/25 | 75/25 | 75/25 | 75/25 | 75/25 |
| | Mw (×10,000) | | | | 30 | 30 | 30 | 30 | 30 |
| | Mw/Mn | | | | 6.5 | 6.5 | 6.5 | 6.5 | 6.5 |
| | Glass transition temperature (° C.) | | | | −35 | −35 | −35 | −35 | −35 |
| | Non-volatile fraction (%) | | | | 60 | 60 | 60 | 60 | 60 |

| | | | | | Synthesis Example 21 | Synthesis Example 22 | Synthesis Example 23 | Synthesis Example 24 | Synthesis Example 25 |
|---|---|---|---|---|---|---|---|---|---|
| | | Acrylic polymer | | | X2-6 | X2-7 | X2-8 | X2-9 | X2-10 |
| Reaction tank | Monomer (A) | Monomer having no carboxyl group | 2-EHA | | 7.5 | 9 | 9 | 9 | 9 |
| | | | BA | | 10.5 | 10.2 | 10.5 | 10.2 | 10 |
| | | | EA | | 3 | | | | |
| | | | MA | | | 1.8 | 1.8 | 1.8 | 1.5 |
| | | Monomer having carboxyl group | AA | | 0.8 | 0.8 | 0.6 | 0.8 | 0.8 |
| | | | MAA | | | | | | |
| | | Alcohol solvent (C) | EtOH | | 26.8 | 26.8 | 26.8 | 20 | 27 |
| | | Polymerization initiator | VA-061 | | 0.005 | 0.005 | 0.005 | 0.005 | 0.005 |
| Dropwise addition tank | Monomer (A) | Monomer having no carboxyl group | 2-EHA | | 27.5 | 32 | 32.5 | 32 | 32 |
| | | | BA | | 36.42 | 36.1 | 36.45 | 36.15 | 36.5 |
| | | | EA | | 10.6 | | | | |
| | | | MA | | | 6.4 | 6.4 | 6.4 | 6.3 |
| | | Monomer having carboxyl group | AA | | 2.9 | 2.9 | 2 | 2.9 | 2.9 |
| | | | MAA | | | | | | |
| | | Monomer (B) | EDMA | | | | | 0.75 | 1 |
| | | | DEDMA | | 0.78 | | | | |
| | | | PEGDMA4 | | | 0.8 | | | |
| | | Alcohol solvent (C) | EtOH | | 16 | 16 | 16 | 23 | 18 |
| | | Polymerization initiator | VA-061 | | 0.016 | 0.017 | 0.017 | 0.017 | 0.017 |

TABLE 2-continued

| | | | | | | | |
|---|---|---|---|---|---|---|---|
| Polymerization initiator (after 2 hours) | | PEROYL L | 0.02 | 0.02 | 0.02 | 0.02 | 0.02 |
| Polymerization initiator (after 4 hours) | | PEROYL L | 0.06 | 0.06 | 0.06 | 0.06 | 0.06 |
| Alcohol solvent during polymerization (%) | | | 42.8 | 42.8 | 42.8 | 43.0 | 45.0 |
| Amine compound (E) | | Ammonia | 4 | 4 | 4 | 4 | 4 |
| | | DMAE | | | | | |
| Amine/carboxyl groups (mol) | | | 2 | 2 | 2 | 2 | 2 |
| Diluting alcohol solvent (C) | | EtOH | 20 | 20 | 20 | 19.8 | 17.8 |
| Monomer (A) % by weight | | | 99.22% | 99.20% | 99.25% | 99.25% | 99.00% |
| Monomer (B) % by weight | | | 0.78% | 0.80% | 0.75% | 0.75% | 1.00% |
| Properties | MwL (×10,000) | | 12 | 12 | 12 | 12 | 17 |
| | MwH (×10,000) | | 90 | 90 | 90 | 90 | 95 |
| | Low-molecular weight component/high molecular weight component area ratio | | 75/25 | 75/25 | 75/25 | 75/25 | 70/30 |
| | Mw (×10,000) | | 30 | 30 | 30 | 40 | 35 |
| | Mw/Mn | | 6.5 | 6.6 | 6.5 | 6.5 | 6.7 |
| | Glass transition temperature (° C.) | | −37 | −35 | −37 | −35 | −35 |
| | Non-volatile fraction (%) | | 60 | 60 | 60 | 60 | 60 |

TABLE 3

| | | | | Synthesis Example 26 | Synthesis Example 27 | Synthesis Example 28 | Synthesis Example 29 | Synthesis Example 30 | Synthesis Example 31 | Synthesis Example 32 |
|---|---|---|---|---|---|---|---|---|---|---|
| | | Acrylic polymer | | Y-1 | Y-2 | Y-3 | Y-4 | Y-5 | Y-6 | Y-7 |
| Reaction tank | Monomer (A) | Monomer having no carboxyl group | 2-EHA | 9 | 9.0 | 9 | 9 | 9 | 9 | 9 |
| | | | BA | 10.2 | 10.0 | 10.5 | 10 | 10.2 | 10.2 | 10.2 |
| | | | MA | 1.8 | 2.0 | 1.8 | 1.8 | 1.8 | 1.6 | 1.6 |
| | | Monomer having carboxyl group | AA | 0.8 | | 0.8 | 0.8 | 0.8 | 0.8 | 0.8 |
| | | | MAA | | | | | | | |
| | | Other monomer | 2-HEA | | 0.4 | | | | | |
| | | Alcohol solvent (C) | EtOH | 26.8 | 10.0 | 10.0 | 10.0 | 10.0 | 10.0 | 10.0 |
| | | Polymerization initiator | VA-061 | 0.005 | 0.005 | 0.005 | 0.005 | 0.005 | 0.005 | 0.005 |
| Dropwise addition tank | Monomer (A) | Monomer having no carboxyl group | 2-EHA | 32.4 | 33.0 | 35.0 | 31.0 | 32.0 | 32.6 | 32.6 |
| | | | BA | 36.5 | 37.0 | 40.0 | 35.1 | 36.8 | 36.0 | 36.1 |
| | | | EA | | | | | | | |
| | | | MA | 6.4 | 6.5 | | 6.4 | 6.4 | 6.2 | 6.2 |
| | | Monomer having carboxyl group | AA | 2.9 | | 2.9 | 2.9 | 2.9 | 2.9 | 2.9 |
| | | Monomer (B) | EDMA | | 0.8 | 0.05 | 3.0 | | | |
| | | Other monomers | 2-HEA | | 1.3 | | | | | |
| | | | HDDA | | | | | | 0.7 | |
| | | | PEGDA4 | | | | | | | 0.6 |
| | | | TMPMA | | | | | 0.1 | | |
| | | Alcohol solvent (C) | EtOH | 16.0 | 33.0 | 33.0 | 33.0 | 33.0 | 33.0 | 33.0 |
| | | Polymerization initiator | VA-061 | 0.04 | 0.06 | 0.06 | 0.06 | 0.06 | 0.06 | 0.06 |
| Polymerization initiator (after 2 hours) | | | PEROYL L EDMA | 0.02 | 0.02 | 0.02 | 0.02 | 0.02 | 0.02 | 0.02 |
| Polymerization initiator (after 4 hours) | | | PEROYL L | 0.06 | 0.06 | 0.06 | 0.06 | 0.06 | 0.06 | 0.06 |
| Alcohol solvent during polymerization (%) | | | | 42.8 | 43.0 | 43.0 | 43.0 | 43.0 | 43.0 | 43.0 |
| Amine compound (E) | | | Ammonia | | | | | | | |
| | | | DMAE | | | | | | | |
| Amine/carboxyl groups (mol) | | | | | | | | | | |
| Diluting alcohol solvent (C) | | | EtOH | 23.6 | 23.6 | 23.6 | 23.6 | 23.6 | 23.6 | 23.6 |
| Monomer (A) % by weight | | | | 100.0% | 97.50% | 99.95% | 97.00% | 99.90% | 99.30% | 99.40% |
| Monomer (B) % by weight | | | | 0.00% | 0.80% | 0.05% | 3.00% | 0.00% | 0.00% | 0.00% |
| Properties | MwL (×10,000) | | | one peak | 15 | 10 | gelled | 20 | gelled | gelled |
| | MwH (×10,000) | | | | 90 | 60 | | 100 | | |
| | Low-molecular weight component/high molecular weight component area ratio | | | | 75/25 | 95/5 | | 40/60 | | |
| | Mw (×10,000) | | | 8 | 35 | 18 | | 53 | | |
| | Mw/Mn | | | 2.9 | 6.5 | 6.1 | | 7 | | |
| | Glass transition temperature (° C.) | | | −35 | −37 | −35 | | −32 | | |
| | Non-volatile fraction (%) | | | 60 | 60 | 60 | | 60 | | |

TABLE 3-continued

|  |  |  |  | Synthesis Example 33 | Synthesis Example 34 | Synthesis Example 35 | Synthesis Example 36 | Synthesis Example 37 | Synthesis Example 38 |
|---|---|---|---|---|---|---|---|---|---|
|  |  | Acrylic polymer |  | Y-8 | Y-9 | Y-10 | Y-11 | Y-12 | Y-13 |
| Reaction tank | Monomer (A) | Monomer having no carboxyl group | 2-EHA | 9 | 9 | 9 | 9 | 9 | 9 |
|  |  |  | BA | 10 | 10 | 10.2 | 10.2 | 10.2 | 10 |
|  |  |  | MA | 1.8 | 1.8 | 1.8 | 1.8 | 1.8 | 1.8 |
|  |  | Monomer having carboxyl group | AA | 0.8 | 0.8 | 0.8 | 0.8 | 0.8 | 0.8 |
|  |  |  | MAA |  |  |  |  |  |  |
|  |  | Other monomer | 2-HEA |  |  |  |  |  |  |
|  |  | Alcohol solvent (C) | EtOH | 26.8 | 26.8 | 10.0 | 10.0 | 26.8 | 26.8 |
|  |  | Polymerization initiator | VA-061 | 0.005 | 0.0025 | 0.005 | 0.005 | 0.005 | 0.0025 |
| Dropwise addition tank | Monomer (A) | Monomer having no carboxyl group | 2-EHA | 32 | 32.05 | 32.5 | 32.5 | 32 | 32.05 |
|  |  |  | BA | 36.15 | 36.3 | 36.4 | 36.4 | 36.15 | 36.3 |
|  |  |  | EA |  |  |  |  |  |  |
|  |  |  | MA | 6.4 | 6.4 | 6.4 | 6.4 | 6.4 | 6.4 |
|  |  | Monomer having carboxyl group | AA | 2.8 | 2.8 | 2.9 | 2.9 | 2.9 | 2.8 |
|  |  | Monomer (B) | EDMA | 0.75 | 0.75 | 0.05 | 0.05 | 0.75 | 0.75 |
|  |  | Other monomers | 2-HEA |  |  |  |  |  |  |
|  |  |  | HDDA |  |  |  |  |  |  |
|  |  |  | PEGDA4 |  |  |  |  |  |  |
|  |  |  | TMPMA |  |  |  |  |  |  |
|  |  | Alcohol solvent (C) | EtOH | 16 | 16 | 33.0 | 33.0 | 16 | 16 |
|  |  | Polymerization initiator | VA-061 | 0.017 | 0.017 | 0.06 | 0.06 | 0.017 | 0.017 |
|  | Polymerization initiator (after 2 hours) | | PEROYL L | 0.06 | 0.1 | 0.02 | 0.02 | 0.06 | 0.1 |
|  |  |  | EDMA | 0.3 | 0.1 |  |  | 0.3 | 0.1 |
|  | Polymerization initiator (after 4 hours) | | PEROYL L | 0.06 | 0.06 | 0.06 | 0.06 | 0.06 | 0.06 |
|  |  | Alcohol solvent during polymerization (%) |  | 42.8 | 42.8 | 43.0 | 43.0 | 42.8 | 42.8 |
|  |  | Amine compound (E) | Ammonia |  |  | 4 |  | 4 | 4 |
|  |  |  | DMAE |  |  |  | 5 |  |  |
|  |  | Amine/carboxyl groups (mol) |  |  |  | 2 | 2 | 2 | 2 |
|  |  | Diluting alcohol solvent (C) | EtOH | 23.6 | 24.6 | 19.8 | 18.8 | 19.8 | 19.8 |
|  |  | Monomer (A) % by weight |  | 98.95% | 99.15% | 99.95% | 99.95% | 98.95% | 99.15% |
|  |  | Monomer (B) % by weight |  | 1.05% | 0.85% | 0.05% | 0.05% | 1.05% | 0.85% |
| Properties |  | MwL (×10,000) |  | 13 | 13 | 5 | 5 | 13 | 13 |
|  |  | MwH (×10,000) |  | 90 | 85 | 60 | 60 | 90 | 85 |
|  |  | Low-molecular weight component/high molecular weight component area ratio |  | 60/40 | 85/15 | 90/10 | 90/10 | 60/40 | 85/15 |
|  |  | Mw (×10,000) |  | 35 | 35 | 18 | 18 | 30 | 35 |
|  |  | Mw/Mn |  | 7.3 | 7.3 | 6.1 | 6.1 | 7.3 | 7.3 |
|  |  | Glass transition temperature (° C.) |  | −35 | −35 | −35 | −35 | −35 | −35 |
|  |  | Non-volatile fraction (%) |  | 60 | 60 | 60 | 60 | 60 | 60 |

TABLE 4

|  |  |  |  | Synthesis Example 39 | Synthesis Example 40 | Synthesis Example 41 | Synthesis Example 42 |
|---|---|---|---|---|---|---|---|
|  |  | Acrylic polymer |  | Y-14 | Y-15 | Y-16 | Y-17 |
| Reaction tank | Monomer (A) | Monomer having no carboxyl group | 2-EHA |  | 34.5 | 38.5 | 38.5 |
|  |  |  | BA | 93.9 | 47.5 | 44.6 | 44.6 |
|  |  |  | EA |  |  |  |  |
|  |  |  | MA |  |  | 8.2 | 8.2 |
|  |  | Monomer having carboxyl group | AA | 5 | 4 | 0.7 | 0.7 |
|  |  | Other monomers | 2-HEA | 0.5 | 0.01 |  |  |
|  |  |  | PEGDA9 | 0.6 |  |  |  |
|  |  | Alcohol solvent (C) | EtOH | 100 |  |  |  |
|  |  | Other solvent | EAc |  | 40.5 | 40.5 | 40.5 |
|  |  | Polymerization initiator | KAYAESTER O | 0.07 |  |  |  |
|  |  |  | PERHEXA HC |  | 0.05 | 0.05 | 0.05 |
| Polymerization initiator (50 minutes) | Chain transfer agent | | n-DM |  | 5 | 5 | 5 |
|  | Monomer | | 2-HEA |  | 8.99 |  |  |
|  |  | | AA |  |  | 3 | 3 |
| Polymerization initiator (3 times at 30 minute intervals, starting at 50 minutes after start of polymerization) | | | PERHEXYL O |  | 0.032 | 0.032 | 0.032 |
|  | | | PERHEXYL PV |  | 0.08 | 0.08 | 0.08 |
|  |  | Alcohol solvent during polymerization (%) |  | 100.0 |  |  |  |
|  |  | Amine compound (E) | Ammonia |  |  |  | 4 |
|  |  | Amine/carboxyl groups (mol) |  |  |  |  | 2 |
|  |  | Other diluting solvent | EAc |  | 26.5 | 26.5 | 23 |
|  |  | Monomer (A) % by weight |  | 98.90% | 99.99% | 100.00% | 100.00% |
|  |  | Monomer (B) % by weight |  | 0.00% | 0.00% | 0.00% | 0.00% |

TABLE 4-continued

|  |  | Synthesis Example 39 | Synthesis Example 40 | Synthesis Example 41 | Synthesis Example 42 |
|---|---|---|---|---|---|
| Properties | MwL (×10,000) | one peak | 1 | 1 | 1 |
|  | MwH (×10,000) |  | 80 | 80 | 80 |
|  | Low-molecular weight component/high molecular weight component area ratio |  | 80/20 | 80/20 | 80/20 |
|  | Mw (×10,000) | 15 | 40 | 40 | 40 |
|  | Mw/Mn | 6.5 | 6.7 | 6.9 | 6.5 |
|  | Glass transition temperature (° C.) | −45 | −36 | −38 | −38 |
|  | Non-volatile fraction (%) | 50 | 60 | 60 | 60 |

The abbreviations used in the above synthesis examples and Tables 1 to 4 are explained below.
<Monomer (A)>
(Monomers Having No Carboxyl Group)
  2-EHA: 2-ethylhexyl acrylate
  BA: butyl acrylate
  EA: ethyl acrylate
  MA: methyl acrylate
(Monomers Having a Carboxyl Group)
  AA: acrylic acid
  MAA: methacrylic acid
<Monomer (B)>
  EDMA: ethylene glycol dimethacrylate
  DEDMA: diethylene glycol dimethacrylate
  PEGDMA4: polyethylene glycol dimethacrylate (about 4 oxyethylene groups)
  BDDMA: 1,4-butanediol dimethacrylate
<Other Monomers>
  2-HEA: 2-hydroxyethyl acrylate
  HDDA: 1,6-hexanediol diacrylate
  PEGDA4: polyethylene glycol diacrylate (about 4 oxyethylene groups)
  PEGDA9: polyethylene glycol diacrylate (about 9 oxyethylene groups)
  TMPMA: trimethylolpropane trimethacrylate
<Solvents>
  EtOH: ethanol
  EAc: ethyl acetate
<Polymerization Initiators>
  VA-061: 2,2'-azobis[2-(2-imidazolin-2-yl)propane] (manufactured by Wako Pure Chemical Industries, Ltd.)
  PEROYL L: dilauroyl peroxide (manufactured by NOF Corporation)
  PERBEXA HC: 1,1-(tert-hexylperoxy)cyclohexane (manufactured by NOF Corporation)
  PERHEXYL O: tert-hexylperoxy-2-ethylhexanoate (manufactured by NOF Corporation)
  PERHEXYL PV: tert-hexylperoxypivalate (manufactured by NOF Corporation)
  AIBN: 2,2'-azobisisobutyronitrile (manufactured by Wako Pure Chemical Industries, Ltd.)
  KAYAESTER O: tert-butylperoxy-2-ethylhexanoate
  n-DM: n-dodecyl mercaptan
<Amine Compound (E)>
  Ammonia: 25% aqueous solution of ammonia
  DMAE: dimethylaminoethanol Production of Pressure-Sensitive Adhesive Compositions Examples 1 to 33

The acrylic polymers were mixed in accordance with the non-volatile fraction equivalent amounts shown in Table 5, with a non-volatile fraction equivalent amount of a crosslinking agent shown in Table 5 blended with 100 parts by weight of the non-volatile fraction of each of the acrylic polymers, thus obtaining a series of pressure-sensitive adhesive compositions (D-1 to D-33).

Comparative Examples 1 to 28

The acrylic polymers were mixed in accordance with the non-volatile fraction equivalent amounts shown in Table 6, with the non-volatile fraction equivalent amount of a crosslinking agent shown in Table 6 blended with 100 parts by weight of the non-volatile fraction of each of the acrylic polymers, thus obtaining a series of pressure-sensitive adhesive compositions (D-34 to D-61).

TABLE 5

|  | Pressure-sensitive adhesive composition | Acrylic polymer | | Crosslinking agent | | Solvent | | |
|---|---|---|---|---|---|---|---|---|
|  |  | Polymer type | parts | Crosslinking agent type | parts | Solvent type | parts | non-volatile fraction (%) |
| Example 1 | D-1 | X-1 | 100 | TETRAD-C | 0.2 | IPA | 20 | 50 |
| Example 2 | D-2 | X-1 | 100 | TETRAD-X | 0.2 | IPA | 20 | 50 |
| Example 3 | D-3 | X-2 | 100 | TETRAD-X | 0.2 | IPA | 20 | 50 |
| Example 4 | D-4 | X-3 | 100 | TETRAD-X | 0.2 | IPA | 20 | 50 |
| Example 5 | D-5 | X-4 | 100 | TETRAD-X | 0.2 | IPA | 20 | 50 |
| Example 6 | D-6 | X-5 | 100 | TETRAD-X | 0.2 | IPA | 20 | 50 |
| Example 7 | D-7 | X-6 | 100 | TETRAD-X | 0.2 | IPA | 20 | 50 |
| Example 8 | D-8 | X-7 | 100 | TETRAD-X | 0.2 | IPA | 20 | 50 |
| Example 9 | D-9 | X-8 | 100 | TETRAD-X | 0.2 | IPA | 20 | 50 |
| Example 10 | D-10 | X-9 | 100 | TETRAD-X | 0.2 | IPA | 20 | 50 |
| Example 11 | D-11 | X-10 | 100 | TETRAD-X | 0.2 | IPA | 20 | 50 |
| Example 12 | D-12 | X-11 | 100 | TETRAD-X | 0.2 | IPA | 20 | 50 |
| Example 13 | D-13 | X-12 | 100 | TETRAD-X | 0.2 | IPA | 20 | 50 |

TABLE 5-continued

| | Pressure-sensitive adhesive composition | Acrylic polymer Polymer type | parts | Crosslinking agent Crosslinking agent type | parts | Solvent Solvent type | parts | non-volatile fraction (%) |
|---|---|---|---|---|---|---|---|---|
| Example 14 | D-14 | X-13 | 100 | TETRAD-X | 0.2 | IPA | 20 | 50 |
| Example 15 | D-15 | X-14 | 100 | TETRAD-X | 0.2 | IPA | 20 | 50 |
| Example 16 | D-16 | X2-1 | 100 | TMXCDI-EO | 2.5 | IPA | 19 | 50 |
| Example 17 | D-17 | X2-2 | 100 | DCHMCDI-EO/PO | 3.5 | IPA | 19 | 50 |
| Example 18 | D-18 | X2-2 | 100 | TMXCDI-EO | 2.5 | IPA | 19 | 50 |
| Example 19 | D-19 | X2-3 | 100 | DCHMCDI-EO/PO | 3.5 | IPA | 19 | 50 |
| Example 20 | D-20 | X2-3 | 100 | TMXCDI-EO | 2.5 | IPA | 19 | 50 |
| Example 21 | D-21 | X2-4 | 100 | TMXCDI-EO | 2.5 | IPA | 19 | 50 |
| Example 22 | D-22 | X2-5 | 100 | DCHMCDI-EO/PO | 3.5 | IPA | 19 | 50 |
| Example 23 | D-23 | X2-5 | 100 | TMXCDI-EO | 2.5 | IPA | 19 | 50 |
| Example 24 | D-24 | X2-6 | 100 | DCHMCDI-EO/PO | 3.5 | IPA | 19 | 50 |
| Example 25 | D-25 | X2-6 | 100 | TMXCDI-EO | 2.5 | IPA | 19 | 50 |
| Example 26 | D-26 | X2-7 | 100 | DCHMCDI-EO/PO | 3.5 | IPA | 19 | 50 |
| Example 27 | D-27 | X2-7 | 100 | TMXCDI-EO | 2.5 | IPA | 19 | 50 |
| Example 28 | D-28 | X2-8 | 100 | DCHMCDI-EO/PO | 3.5 | IPA | 19 | 50 |
| Example 29 | D-29 | X2-8 | 100 | TMXCDI-EO | 2.5 | IPA | 19 | 50 |
| Example 30 | D-30 | X2-9 | 100 | DCHMCDI-EO/PO | 3.5 | IPA | 20 | 50 |
| Example 31 | D-31 | X2-9 | 100 | TMXCDI-EO | 2.5 | IPA | 20 | 50 |
| Example 32 | D-32 | X2-10 | 100 | DCHMCDI-EO/PO | 3.5 | IPA | 20 | 50 |
| Example 33 | D-33 | X2-10 | 100 | TMXCDI-EO | 2.5 | IPA | 20 | 50 |

TABLE 6

| | Pressure-sensitive adhesive composition | Acrylic polymer Polymer type | parts | Crosslinking agent Crosslinking agent type | parts | solvent Solvent type | parts | Solid fraction (%) |
|---|---|---|---|---|---|---|---|---|
| Comparative Example 1 | D-34 | X-1 | 100 | TDI/TMP | 2 | IPA | 22 | 50 |
| Comparative Example 2 | D-35 | X-1 | 100 | TDI/TMP | 6 | IPA | 26 | 50 |
| Comparative Example 3 | D-36 | X-1 | 100 | IPDI/nurate | 3 | IPA | 23 | 50 |
| Comparative Example 4 | D-37 | X-1 | 100 | Al-A | 2 | IPA | 23 | 50 |
| Comparative Example 5 | D-38 | X2-1 | 100 | Al-A | 2 | IPA | 23 | 50 |
| Comparative Example 6 | D-39 | Y-1 | 100 | TETRAD-X | 0.6 | IPA | 20.6 | 50 |
| Comparative Example 7 | D-40 | Y-2 | 100 | TETRAD-X | 0.6 | IPA | 20.6 | 50 |
| Comparative Example 8 | D-41 | Y-2 | 100 | TDI/TMP | 6 | IPA | 26 | 50 |
| Comparative Example 9 | D-42 | Y-2 | 100 | IPDI/nurate | 3 | IPA | 23 | 50 |
| Comparative Example 10 | D-43 | Y-3 | 100 | TETRAD-X | 0.6 | IPA | 20.6 | 50 |
| Comparative Example 11 | D-44 | Y-5 | 100 | TETRAD-X | 0.6 | IPA | 20.6 | 50 |
| Comparative Example 12 | D-45 | Y-8 | 100 | TETRAD-X | 0.6 | IPA | 20.6 | 50 |
| Comparative Example 13 | D-46 | Y-9 | 100 | TETRAD-X | 0.6 | IPA | 20.6 | 50 |
| Comparative Example 14 | D-47 | Y-10 | 100 | DCHMCDI-EO/PO | 3.5 | IPA | 20 | 50 |
| Comparative Example 15 | D-48 | Y-10 | 100 | TMXCDI-EO | 2 | IPA | 20 | 50 |
| Comparative Example 16 | D-49 | Y-11 | 100 | DCHMCDI-EO/PO | 3.5 | IPA | 20 | 50 |
| Comparative Example 17 | D-50 | Y-11 | 100 | TMXCDI-EO | 2 | IPA | 20 | 50 |
| Comparative Example 18 | D-51 | Y-12 | 100 | DCHMCDI-EO/PO | 3.5 | IPA | 20 | 50 |
| Comparative Example 19 | D-52 | Y-12 | 100 | TMXCDI-EO | 2 | IPA | 20 | 50 |
| Comparative Example 20 | D-53 | Y-13 | 100 | DCHMCDI-EO/PO | 3.5 | IPA | 20 | 50 |
| Comparative Example 21 | D-54 | Y-13 | 100 | TMXCDI-EO | 2 | IPA | 20 | 50 |

TABLE 6-continued

|  | Pressure-sensitive adhesive composition | Acrylic polymer | | Crosslinking agent | | solvent | | Solid fraction (%) |
|---|---|---|---|---|---|---|---|---|
|  |  | Polymer type | parts | Crosslinking agent type | parts | Solvent type | parts |  |
| Comparative Example 22 | D-55 | Y-14 | 100 | TDI/TMP | 6 | IPA | 7 | 50 |
| Comparative Example 23 | D-56 | Y-14 | 100 | IPDI/nurate | 3 | IPA | 3.6 | 50 |
| Comparative Example 24 | D-57 | Y-15 | 100 | TDI/TMP | 2 | EA | 22 | 50 |
| Comparative Example 25 | D-58 | Y-15 | 100 | IPDI/nurate | 3 | EA | 23 | 50 |
| Comparative Example 26 | D-59 | Y-16 | 100 | TETRAD-X | 0.6 | EA | 20 | 50 |
| Comparative Example 27 | D-60 | Y-17 | 100 | DCHMCDI-EO/PO | 3.5 | EA | 18 | 50 |
| Comparative Example 28 | D-61 | Y-17 | 100 | TMXCDI-EO | 2 | EA | 18 | 50 |

The abbreviations used in Tables 5 and 6 are explained below.

<Crosslinking Agent (D1)>
TETRAD-X: N,N,N',N'-tetraglycidyl-m-xylylenediamine
TETRAD-C: 1,3-bis(N,N-diglycidylaminomethyl)cyclohexane
(both manufactured by Mitsubishi Gas Chemical Co., Inc.)

<Crosslinking Agent (D2)>
DCHMCDI-EO/PO: a terminal polyethylene oxide monomethyl ether (about 12 ethylene oxide groups)/polypropylene oxide monomethyl ether (about 1 to 3 propylene oxide groups) adduct of poly-(4,4'-dicyclohexylmethanecarbodiimide) (a water-dispersible polycarbodiimide)
TMXCDI-EO: a terminal polyethylene oxide monomethyl ether (about 6 to 12 ethylene oxide groups) adduct of poly-(m-tetramethylxylylenecarbodiimide) (a water-soluble polycarbodiimide)

<Other Crosslinking Agents>
TDI/TMP: tolylene diisocyanate trimethylolpropane adduct
IPDI/TMP: isophorone diisocyanate trimethylolpropane adduct
IPDI/nurate: nurate form of isophorone diisocyanate
Al-A: aluminum tris(acetylacetonate) (manufactured by Kawaken Fine Chemicals Co., Ltd.)

<Solvents>
IPA: isopropyl alcohol
EA: ethyl acetate

Production of Pressure-Sensitive Adhesive Sheets

Example 1

The prepared pressure-sensitive adhesive composition (D-1) was left to stand at a temperature of 25° C. for one hour, was subsequently applied to a polyester releasable film (manufactured by Lintec Corporation, hereafter simply referred to as a "releasable film") in an amount sufficient to form a thickness following drying of 25 µm, and was then dried at 100° C. for 2 minutes. The thus obtained pressure-sensitive adhesive layer was bonded to a polyester film substrate (thickness: 50 µm, E-5301 manufactured by Toyobo Co., Ltd.) to form a pressure-sensitive adhesive sheet. The resulting pressure-sensitive adhesive sheet was aged (by dark reaction) for one week under conditions including a temperature of 23° C. and a relative humidity of 50%, thereby allowing reaction of the pressure-sensitive adhesive layer to proceed to obtain a pressure-sensitive adhesive sheet (SA-1).

Further, another sample of the pressure-sensitive adhesive composition (D-1) was left to stand at a temperature of 25° C. for 8 hours, and was then used to prepare a pressure-sensitive adhesive sheet (SB-1) in a similar manner.

Examples 2 to 33, Comparative Examples 1 to 28

With the exception of using the pressure-sensitive adhesive compositions shown in Table 7 and Table 8, pressure-sensitive adhesive sheets (SA-2 to SA-61) and (SB-2 to SB-61) were prepared in the same manner as Example 1.

<Evaluations>

The pressure-sensitive adhesive compositions and pressure-sensitive adhesive sheets obtained in the examples and comparative examples were evaluated using the methods described below. The results are shown in Table 7 and Table 8.

<Evaluations of Pressure-Sensitive Adhesive Compositions>
(Coating Liquid Storage Stability)

Following addition of the crosslinking agent (D) to the obtained pressure-sensitive adhesive composition, the viscosity was measured every hour for 24 hours using a B-type viscometer (manufactured by Tokyo Keiki Inc.) under conditions including rotation for one minute at 12 rpm, and the storage stability was evaluated using a four-step scale.

A: increase in viscosity of less than 1.5-fold after 24 hours. Extremely good result. No problems.
B: increase in viscosity of less than 1.5-fold after 8 hours. No problems.
C: increase in viscosity of less than 1.5-fold after 5 hours. No problems in practical applications.
D: gelling in less than 5 hours. Problems in practical applications.

(Coatability)

The obtained pressure-sensitive adhesive composition was coated onto a releasable film using a comma coater at a speed of 2 m/min, the composition was dried in an oven at 100° C. to form a pressure-sensitive adhesive layer with a thickness of 25 µm, and a polyester film with a thickness of 50 µm was bonded to the surface of the pressure-sensitive adhesive layer to prepare a pressure-sensitive adhesive film. The releasable film was then removed, and the state of the surface of the pressure-sensitive adhesive layer (coating surface) was inspected visually, and evaluated using a three-step scale.

B: smooth coating surface, absolutely no problems.

C: some minor cissing or bubbles confirmed at the edges of the coating surface, but of no problem in practical applications.

D: cissing, bubbling and/or streaking of the coating surface confirmed, causing problems in practical applications.
<Evaluations of Pressure-Sensitive Adhesive Sheets>
(Measurement of Sheet External Appearance)

For each pressure-sensitive adhesive sheet (SA-1 to SA-61), the external appearance was inspected visually and evaluated based on the evaluation criteria of a three-step scale.

B: colorless and transparent, absolutely no problems in practical applications.

C: some points of coloration or aggregates visible, but of no problem in practical applications.

D: cloudy, or large numbers of aggregates, causing problems in practical applications.
(Initial Curability)

Each of the pressure-sensitive adhesive sheets (SA-1 to SA-61) of thickness 25 μm was cut to a size of 30 mm×80 mm, and a sample was prepared by wrapping the sheet in a metal mesh. The weight of only the pressure-sensitive adhesive layer was determined by weighing the sample using a precision balance, and then subtracting the weight of a blank film prepared in the same manner but having no pressure-sensitive adhesive layer. This weight is termed M1. Using a Soxhlet (extractor), the sample was immersed in ethyl acetate solvent and treated for 16 hours under reflux. Subsequently, the mesh-wrapped sample was removed, air-dried for 24 hours in an atmosphere at a temperature of 23° C. and a relative humidity of 50%, and then dried for a further 12 hours in an oven at 80° C. The weight of only the pressure-sensitive adhesive layer following drying was weighed using a precision balance in the same manner as that described above. This weight is termed M2.

The curability was calculated using the following formula, and then evaluated against a three-step scale.

$$(M2/M1) \times 100 (\%) \quad (P)$$

B: curability of 40% or greater. No problems.

C: curability of at least 20% but less than 40%. No problems in practical applications.

D: curability of less than 20%. Problems in practical applications.
(Change Over Time in Curability)

Each of the pressure-sensitive adhesive sheets (SB-1 to SB-61) of thickness 25 μm was cut to a size of 30 mm×80 mm and wrapped in a metal mesh, and the weight of only the pressure-sensitive adhesive layer was weighed using a precision balance in the same manner as described above. This weight is termed M3. Using a Soxhlet (extractor), the sample was immersed in ethyl acetate solvent and treated for 16 hours under reflux. Subsequently, the sample was removed, air-dried for 24 hours in an atmosphere at a temperature of 23° C. and a relative humidity of 50%, and then dried for a further 12 hours in an oven at 80° C. The weight of only the pressure-sensitive adhesive layer following drying was weighed using a precision balance. This weight is termed M4.

The curability after the passage of time was calculated using the following formula:

$$(M4/M3) \times 100 (\%) \quad (Q)$$

and the change from the initial curability (with the value being an absolute value) was calculated using the formula below, and then evaluated against a three-step scale.

$$(1-(Q)/(P)) \times 100 (\%)$$

B: change of less than 15%. No problems.

C: change of at least 15% but less than 30%. No problems in practical applications.

D: change of 30% or more. Problems in practical applications.
(Aging Suitability)

Each of the pressure-sensitive adhesive sheets (SA-1 to SA-61) was aged under conditions including a temperature of 23° C. and a relative humidity of 50%, the value of (P) was determined after each day of aging using the same method as that described in the above (initial curability) evaluation, curing was deemed to have been completed when the change in the value of (P) from the previous day was less than 3%, and the number of days of aging required to complete aging was evaluated against a three-step scale.

B: number of days of aging was less than 3 days, absolutely no problems in practical applications.

C: number of days of aging was at least 3 days but less than 8 days, of no problem in practical applications.

D: number of days of aging was at least 8 days, causing problems in practical applications.
(Adhesiveness)

In accordance with JIS Z 0237, each of the obtained pressure-sensitive adhesive sheets (SA-1 to SA-61) was cut to a width of 25 mm, the releasable film was removed, the surface of the exposed pressure-sensitive adhesive layer was bonded to one of the adherends mentioned below, and the adhesive strength (N) upon peeling the layer at a direction of 180 degrees to the adherend was measured. Measurements were performed inside a chamber at a temperature of 25° C. and a relative humidity of 50%, using a pulling speed of 300 mm/min. The measurements of the adhesive strength measured the permanent adhesive strength by bonding the pressure-sensitive adhesive layer to each of the adherends (stainless steel (SUS), polypropylene (PP) and polyethylene (PE)), and then leaving the bonded samples to stand for 24 hours in a chamber at a temperature of 25° C. and a relative humidity of 50% before measurement was performed. The peeling behavior for the PP sample was also evaluated against a three-step scale.

B: no zipping during peeling, with peeling occurring smoothly. No problems in practical applications.

C: some partial zipping occurs during peeling, but of no problem in practical applications.

D: Zipping occurs across the entire sample or peeling occurs as a result of cohesive failure, causing problems in practical applications.
(Releasability)

In accordance with JIS Z 0237, each of the obtained pressure-sensitive adhesive sheets (SA-1 to SA-61) was cut to a width of 25 mm, the releasable film was removed, the surface of the exposed pressure-sensitive adhesive layer was bonded to an adherend (stainless steel (SUS)), and following standing for 24 hours at a temperature of 5° C., 25° C. or 50° C., the releasability upon peeling the layer at a direction of 180 degrees to the adherend was observed and evaluated against a two-step scale. The measurements were performed inside a chamber at a temperature of 25° C. and a relative humidity of 50%, using a pulling speed of 300 mm/min, and the releasability during peeling was evaluated against a two-step scale.

B: peeling occurred at the interface with the adherend, and no adhesive residue was left on the adherend. No problems in practical applications.

D: either peeling occurred via cohesive failure, or peeling occurred at the interface with the adherend, but yielded soiling such as cloudiness on the adherend, causing problems in practical applications.

(Measurement of Heat-Resistant Holding Power)

The holding power was measured in accordance with JIS Z 0237. Each of the obtained pressure-sensitive adhesive sheets (SA-1 to SA-61) was cut to a width of 25 mm and a length of 150 mm, and one end of the sample sheet was bonded to one end of a SUS plate using a bonding area of 25 mm×25 mm, thus forming a test piece. The stainless steel plate of this test piece was suspended vertically inside a 40° C. constant-temperature chamber, and a 1 kg weight was suspended from the other end of the sheet and left to hang for 72,000 seconds. In Tables 7 and 8, for those samples in which the end of the sheet detached and fell within 72,000 seconds, the time at which the sheet detached was recorded, whereas for those samples which did not detach and fall, a result of "held" was recorded, together with the length of slippage of the sheet from the initial bonding position.

Held samples for which the length of slippage was not more than 0.5 mm: no problems in practical applications.

Held samples for which the length of slippage exceeded 0.5 mm: problems in practical applications.

Detached samples: problems in practical applications.

TABLE 7

| | Pressure-sensitive adhesive composition | Acrylic polymer | Crosslinking agent | Pressure-sensitive adhesive sheet | | Coating liquid storage stability | Coat-ability | Sheet external appearance | Cur-ability | Change over time in curability |
|---|---|---|---|---|---|---|---|---|---|---|
| Example 1 | D-1 | X-1 | TETRAD-C | SA-1 | SB-1 | B | B | B | B | B |
| Example 2 | D-2 | X-1 | TETRAD-X | SA-2 | SB-2 | B | B | B | B | B |
| Example 3 | D-3 | X-2 | TETRAD-X | SA-3 | SB-3 | B | B | B | B | B |
| Example 4 | D-4 | X-3 | TETRAD-X | SA-4 | SB-4 | B | B | B | B | B |
| Example 5 | D-5 | X-4 | TETRAD-X | SA-5 | SB-5 | B | B | B | B | B |
| Example 6 | D-6 | X-5 | TETRAD-X | SA-6 | SB-6 | B | B | B | B | B |
| Example 7 | D-7 | X-6 | TETRAD-X | SA-7 | SB-7 | B | B | B | B | B |
| Example 8 | D-8 | X-7 | TETRAD-X | SA-8 | SB-8 | B | B | B | B | B |
| Example 9 | D-9 | X-8 | TETRAD-X | SA-9 | SB-9 | B | B | B | B | B |
| Example 10 | D-10 | X-9 | TETRAD-X | SA-10 | SB-10 | B | B | B | B | B |
| Example 11 | D-11 | X-10 | TETRAD-X | SA-11 | SB-11 | B | B | B | B | B |
| Example 12 | D-12 | X-11 | TETRAD-X | SA-12 | SB-12 | B | B | B | B | B |
| Example 13 | D-13 | X-12 | TETRAD-X | SA-13 | SB-13 | B | B | B | B | B |
| Example 14 | D-14 | X-13 | TETRAD-X | SA-14 | SB-14 | B | B | B | B | B |
| Example 15 | D-15 | X-14 | TETRAD-X | SA-15 | SB-15 | B | B | B | B | B |
| Example 16 | D-16 | X2-1 | TMXCDI-EO | SA-16 | SB-16 | A | B | B | B | B |
| Example 17 | D-17 | X2-2 | DCHMCDI-EO/PO | SA-17 | SB-17 | A | B | B | B | B |
| Example 18 | D-18 | X2-2 | TMXCDI-EO | SA-18 | SB-18 | A | B | B | B | B |
| Example 19 | D-19 | X2-3 | DCHMCDI-EO/PO | SA-19 | SB-19 | A | B | B | B | B |
| Example 20 | D-20 | X2-3 | TMXCDI-EO | SA-20 | SB-20 | A | B | B | B | B |
| Example 21 | D-21 | X2-4 | TMXCDI-EO | SA-21 | SB-21 | A | B | B | B | B |
| Example 22 | D-22 | X2-5 | DCHMCDI-EO/PO | SA-22 | SB-22 | A | B | B | B | B |
| Example 23 | D-23 | X2-5 | TMXCDI-EO | SA-23 | SB-23 | B | B | C | B | B |
| Example 24 | D-24 | X2-6 | DCHMCDI-EO/PO | SA-24 | SB-24 | A | B | B | B | B |
| Example 25 | D-25 | X2-6 | TMXCDI-EO | SA-25 | SB-25 | A | B | B | B | B |
| Example 26 | D-26 | X2-7 | DCHMCDI-EO/PO | SA-26 | SB-26 | A | B | B | B | B |
| Example 27 | D-27 | X2-7 | TMXCDI-EO | SA-27 | SB-27 | A | B | B | B | B |
| Example 28 | D-28 | X2-8 | DCHMCDI-EO/PO | SA-28 | SB-28 | A | B | B | B | B |
| Example 29 | D-29 | X2-8 | TMXCDI-EO | SA-29 | SB-29 | A | B | B | B | B |
| Example 30 | D-30 | X2-9 | DCHMCDI-EO/PO | SA-30 | SB-30 | A | B | B | B | B |
| Example 31 | D-31 | X2-9 | TMXCDI-EO | SA-31 | SB-31 | A | B | B | B | B |
| Example 32 | D-32 | X2-10 | DCHMCDI-EO/PO | SA-32 | SB-32 | A | B | B | B | B |
| Example 33 | D-33 | X2-10 | TMXCDI-EO | SA-33 | SB-33 | A | B | B | B | B |

| | Aging suitability | Adhesiveness | | | | Releasability | | | Heat-resistant holding power | |
|---|---|---|---|---|---|---|---|---|---|---|
| | | to SUS N | to PP N | | to PE N | 5° C. | 25° C. | 50° C. | time (s) | slippage (mm) |
| | | | | peeling | | | | | | |
| Example 1 | B | 15 | 9 | C | 5 | B | B | B | held | 0 |
| Example 2 | B | 15 | 10 | B | 5 | B | B | B | held | 0 |
| Example 3 | B | 15 | 9 | B | 5 | B | B | B | held | 0 |
| Example 4 | B | 15 | 9 | B | 5 | B | B | B | held | 0 |
| Example 5 | B | 15 | 8 | B | 5 | B | B | B | held | 0 |
| Example 6 | B | 15 | 9 | B | 5 | B | B | B | held | 0 |
| Example 7 | B | 15 | 9 | B | 5 | B | B | B | held | 0 |
| Example 8 | B | 15 | 9 | B | 5 | B | B | B | held | 0 |
| Example 9 | B | 15 | 9 | B | 5 | B | B | B | held | 0 |
| Example 10 | B | 15 | 9 | B | 5 | B | B | B | held | 0 |
| Example 11 | B | 14 | 8 | B | 4 | B | B | B | held | 0 |
| Example 12 | B | 14 | 9 | B | 5 | B | B | B | held | 0 |
| Example 13 | B | 15 | 9 | B | 5 | B | B | B | held | 0 |

TABLE 7-continued

|  |  |  |  |  |  |  |  |  |  |  |
|---|---|---|---|---|---|---|---|---|---|---|
| Example 14 | B | 16 | 8 | B | 4 | B | B | B | held | 0 |
| Example 15 | B | 16 | 9 | B | 5 | B | B | B | held | 0 |
| Example 16 | B | 18 | 9 | B | 5 | B | B | B | held | 0 |
| Example 17 | B | 18 | 9 | B | 5 | B | B | B | held | 0 |
| Example 18 | B | 18 | 9 | B | 5 | B | B | B | held | 0 |
| Example 19 | B | 18 | 9 | B | 5 | B | B | B | held | 0 |
| Example 20 | B | 18 | 8 | B | 5 | B | B | B | held | 0 |
| Example 21 | B | 18 | 9 | B | 5 | B | B | B | held | 0 |
| Example 22 | B | 18 | 9 | B | 5 | B | B | B | held | 0 |
| Example 23 | B | 17 | 9 | B | 4 | B | B | B | held | 0 |
| Example 24 | B | 18 | 8 | B | 5 | B | B | B | held | 0 |
| Example 25 | B | 18 | 8 | B | 5 | B | B | B | held | 0 |
| Example 26 | B | 18 | 8 | B | 5 | B | B | B | held | 0 |
| Example 27 | B | 18 | 8 | B | 5 | B | B | B | held | 0 |
| Example 28 | B | 18 | 8 | B | 5 | B | B | B | held | 0 |
| Example 29 | B | 18 | 8 | B | 5 | B | B | B | held | 0 |
| Example 30 | B | 18 | 8 | B | 5 | B | B | B | held | 0 |
| Example 31 | B | 18 | 8 | B | 5 | B | B | B | held | 0 |
| Example 32 | B | 18 | 8 | B | 5 | B | B | B | held | 0 |
| Example 33 | B | 18 | 8 | B | 5 | B | B | B | held | 0 |

TABLE 8

|  | Pressure-sensitive adhesive composition | Acrylic polymer | Crosslinking agent | Pressure-sensitive adhesive sheet | | Coating liquid storage stability | Coat-ability | Sheet external appearance | Cur-ability | Change over time in curability |
|---|---|---|---|---|---|---|---|---|---|---|
| Comparative Example 1 | D-34 | X-1 | TDI/TMP | SA-34 | SB-34 | A | D | D | D | D |
| Comparative Example 2 | D-35 | X-1 | TDI/TMP | SA-35 | SB-35 | A | D | D | D | D |
| Comparative Example 3 | D-36 | X-1 | IPDI/nurate | SA-36 | SB-36 | A | C | C | C | D |
| Comparative Example 4 | D-37 | X-1 | Al-A | SA-37 | SB-37 | C | B | B | C | B |
| Comparative Example 5 | D-38 | X2-1 | Al-A | SA-38 | SB-38 | A | B | B | C | B |
| Comparative Example 6 | D-39 | Y-1 | TETRAD-X | SA-39 | SB-39 | B | B | C | C | B |
| Comparative Example 7 | D-40 | Y-2 | TETRAD-X | SA-40 | SB-40 | A | C | D | D | B |
| Comparative Example 8 | D-41 | Y-2 | TDI/TMP | SA-41 | SB-41 | A | D | D | D | D |
| Comparative Example 9 | D-42 | Y-2 | IPDI/nurate | SA-42 | SB-42 | A | C | C | C | D |
| Comparative Example 10 | D-43 | Y-3 | TETRAD-X | SA-43 | SB-43 | A | C | C | C | B |
| Comparative Example 11 | D-44 | Y-5 | TETRAD-X | SA-44 | SB-44 | C | D | D | B | B |
| Comparative Example 12 | D-45 | Y-8 | TETRAD-X | SA-45 | SB-45 | C | C | C | B | B |
| Comparative Example 13 | D-46 | Y-9 | TETRAD-X | SA-46 | SB-46 | A | C | C | C | B |
| Comparative Example 14 | D-47 | Y-10 | DCHMCDI-EO/PO | SA-47 | SB-47 | A | C | C | C | B |
| Comparative Example 15 | D-48 | Y-10 | TMXCDI-EO | SA-48 | SB-48 | A | C | C | C | B |
| Comparative Example 16 | D-49 | Y-11 | DCHMCDI-EO/PO | SA-49 | SB-49 | A | C | C | C | B |
| Comparative Example 17 | D-50 | Y-11 | TMXCDI-EO | SA-50 | SB-50 | A | C | C | C | B |
| Comparative Example 18 | D-51 | Y-12 | DCHMCDI-EO/PO | SA-51 | SB-51 | B | C | C | B | B |
| Comparative Example 19 | D-52 | Y-12 | TMXCDI-EO | SA-52 | SB-52 | B | C | C | B | B |
| Comparative Example 20 | D-53 | Y-13 | DCHMCDI-EO/PO | SA-53 | SB-53 | A | C | C | C | B |
| Comparative Example 21 | D-54 | Y-13 | TMXCDI-EO | SA-54 | SB-54 | A | C | C | C | B |
| Comparative Example 22 | D-55 | Y-14 | TDI/TMP | SA-55 | SB-55 | A | D | D | D | D |
| Comparative Example 23 | D-56 | Y-14 | IPDI/nurate | SA-56 | SB-56 | A | D | D | D | D |

TABLE 8-continued

| | | | | | | | | | | | | |
|---|---|---|---|---|---|---|---|---|---|---|---|---|
| Comparative Example 24 | D-57 | Y-15 | TDI/TMP | SA-57 | SB-57 | B | C | C | B | B | | |
| Comparative Example 25 | D-58 | Y-15 | IPDI/nurate | SA-58 | SB-58 | A | C | C | B | B | | |
| Comparative Example 26 | D-59 | Y-16 | TETRAD-X | SA-59 | SB-59 | B | C | C | C | B | | |
| Comparative Example 27 | D-60 | Y-17 | DCHMCDI-EO/PO | SA-60 | SB-60 | B | C | C | C | B | | |
| Comparative Example 28 | D-61 | Y-17 | TMXCDI-EO | SA-61 | SB-61 | A | C | C | C | B | | |

| | | Adhesiveness | | | Releasability | | | Heat-resistant holding power | |
|---|---|---|---|---|---|---|---|---|---|
| | Aging suitability | to SUS N | to PP N peeling | to PE N | 5° C. | 25° C. | 50° C. | time (s) | slippage (mm) |
| Comparative Example 1 | B | 20 | 10 D | 5 | D | D | D | 1000 | — |
| Comparative Example 2 | B | 10 | 3 D | 2 | D | D | D | 2000 | — |
| Comparative Example 3 | C | 18 | 5 C | 3 | D | D | D | 13000 | — |
| Comparative Example 4 | C | 15 | 7 D | 4 | B | B | D | held | 0.6 mm |
| Comparative Example 5 | C | 14 | 7 D | 4 | B | B | D | held | 0.6 mm |
| Comparative Example 6 | B | 17 | 9 B | 5 | B | D | D | 30000 | — |
| Comparative Example 7 | B | 20 | 10 D | 5 | D | D | D | 50000 | — |
| Comparative Example 8 | C | 19 | 10 D | 5 | D | D | D | 3000 | — |
| Comparative Example 9 | C | 18 | 3 C | 3 | D | D | D | 15000 | — |
| Comparative Example 10 | B | 15 | 5 C | 5 | B | D | D | held | 5 mm |
| Comparative Example 11 | B | 12 | 3 D | 2 | B | B | B | held | 0 |
| Comparative Example 12 | B | 14 | 3 D | 2 | B | B | B | held | 0 |
| Comparative Example 13 | B | 15 | 4 C | 3 | B | B | D | held | 1.5 mm |
| Comparative Example 14 | B | 16 | 5 C | 4 | B | B | D | held | 1 mm |
| Comparative Example 15 | B | 16 | 5 C | 4 | B | B | D | held | 1 mm |
| Comparative Example 16 | B | 16 | 5 C | 4 | B | B | D | held | 0.5 mm |
| Comparative Example 17 | B | 16 | 5 C | 3 | B | B | D | held | 0.5 mm |
| Comparative Example 18 | B | 15 | 3 D | | B | B | D | held | 0.5 mm |
| Comparative Example 19 | B | 15 | 3 D | | B | B | D | held | 0.5 mm |
| Comparative Example 20 | B | 16 | 4 C | 3 | B | B | D | held | 1 mm |
| Comparative Example 21 | B | 16 | 4 C | 3 | B | B | D | held | 1 mm |
| Comparative Example 22 | B | 20 | 4 D | 3 | B | B | D | held | 0 |
| Comparative Example 23 | B | 20 | 5 D | 3 | B | B | D | held | 0 |
| Comparative Example 24 | C | 15 | 4 D | 3 | B | B | D | held | 0 |
| Comparative Example 25 | C | 15 | 5 D | 3 | B | B | D | held | 0 |
| Comparative Example 26 | B | 16 | 5 D | 4 | B | B | D | held | 0 |
| Comparative Example 27 | B | 15 | 4 D | 3 | B | B | D | held | 0 |
| Comparative Example 28 | B | 16 | 5 D | 3 | B | B | D | held | 0 |

In Synthesis Examples 1 to 25 in Tables 1 and 2, acrylic polymers having two molecular weight components indicated by two peaks were obtained, and the molecular weight of the low-molecular weight component was larger than the molecular weight of the single-peak Synthesis Example 26. It is thought that this indicates that the methacrylate monomer having two ethylenic unsaturated bonds per molecule is not only incorporated in the high-molecular weight component, but is also incorporated within the low-molecular weight component, meaning both components have branched structures, Further, as illustrated by Examples 1 to 33 in Table 7, the pressure-sensitive adhesive compositions and pressure-sensitive adhesive sheets of the present invention all exhibited favorable results for all of the evaluations, and also exhibited good adhesive strength to PP.

On the other hand, the acrylic polymers of Synthesis Examples 29, 31 and 32 shown in Table 3 suffered gelling during the polymerization, and pressure-sensitive adhesive sheets were not able to be produced. Further, the pressure-sensitive adhesive compositions and pressure-sensitive adhesive sheets of Comparative Examples 1 to 23 shown in Table 8 were unable to provide satisfactory properties, with problems including inferior sheet external appearance, deterioration in the adhesive strength or releasability, or a change over time in the curability. Moreover, in the case of the pressure-sensitive adhesive compositions and pressure-sensitive adhesive sheets of Comparative Examples 24 to 28, which used the acrylic polymers of Synthesis Examples 40 to 42, although the proportion of the low-molecular weight component was large, the adhesiveness to the PP adherend was unsatisfactory, and not only was the adhesive strength inferior and zipping observed during peeling, but the cohesion of the high-molecular weight component was also low, and the releasability at 50° C. was unsatisfactory.

The invention claimed is:

1. A pressure-sensitive adhesive composition, comprising:
a crosslinking agent, and
an acrylic polymer with a glass transition temperature of −60° C. to 0° C. and obtained by radical polymerization in an alcohol solvent of an ethylenic unsaturated bond-containing monomer, the alcohol solvent comprising,
98.0% to 99.9% by weight of a monomer having one ethylenic unsaturated bond per molecule, and
0.1% to 2.0% by weight of a methacrylate monomer having two ethylenic unsaturated bonds per molecule;
wherein:
the acrylic polymer:
has two peak tops in a gel permeation chromatography (GPC) elution curve,
comprises a low-molecular weight component with a weight-average molecular weight of 10,000 to 200,000, and a high-molecular weight component with a weight-average molecular weight of 700,000 to 1,500,000, and
has an area ratio between the low-molecular weight component and the high-molecular weight component in GPC of 65/35 to 80/20,
the monomer (A) comprises a monomer having a carboxyl group, and
the crosslinking agent comprises an epoxy compound, a carbodiimide compound, or both.

2. The pressure-sensitive adhesive composition according to claim 1, wherein a weight-average molecular weight of a combined total of the low-molecular weight component and the high-molecular weight component is from 200,000 to 500,000, and a ratio (Mw/Mn) between the weight-average molecular weight (Mw) and a number-average molecular weight (Mn) is from 3.0 to 10.0.

3. The pressure-sensitive adhesive composition according to claim 1, wherein:
the acrylic polymer comprises carboxyl groups that are neutralized with an amine compound having a boiling point of 150° C. or lower, and
an amount of the amine compound is 1 mol to 3 mol per 1 mol of the carboxyl groups.

4. The pressure-sensitive adhesive composition according to claim 1, wherein the crosslinking agent is an aqueous or water-dispersed carbodiimide compound.

5. A method for producing the pressure-sensitive adhesive composition according to claim 1, comprising:
subjecting 100 parts by weight of the ethylenic unsaturated bond-containing monomer in 20 to 50 parts by weight of ethanol to radical polymerization to obtain the acrylic polymer.

6. The method according to claim 5, wherein the ethylenic unsaturated bond-containing monomer is subjected to radical polymerization using a dropwise addition method.

7. A pressure-sensitive adhesive sheet comprising a pressure-sensitive adhesive layer formed from the pressure-sensitive adhesive composition according to claim 1.

* * * * *